US012732736B2

(12) United States Patent
Fujita et al.

(10) Patent No.: US 12,732,736 B2
(45) Date of Patent: Sep. 8, 2026

(54) WEARABLE DEVICE

(71) Applicant: SONY GROUP CORPORATION, Tokyo (JP)

(72) Inventors: Shuji Fujita, Tokyo (JP); Shinya Ootani, Tokyo (JP); Kazuhito Wakana, Tokyo (JP); Teppei Imamura, Tokyo (JP); Tomoki Kyoizumi, Tokyo (JP); Kazutaka Takaki, Tokyo (JP); Tetsuharu Fukushima, Tokyo (JP); Yukito Inoue, Tokyo (JP); Tomoya Takei, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 49 days.

(21) Appl. No.: 18/849,529

(22) PCT Filed: Mar. 16, 2023

(86) PCT No.: PCT/JP2023/010415
§ 371 (c)(1),
(2) Date: Sep. 22, 2024

(87) PCT Pub. No.: WO2023/189673
PCT Pub. Date: Oct. 5, 2023

(65) Prior Publication Data

US 2025/0220333 A1 Jul. 3, 2025

(30) Foreign Application Priority Data

Mar. 30, 2022 (JP) ................................ 2022-057318

(51) Int. Cl.
*H04R 1/10* (2026.01)
*H04R 5/033* (2006.01)

(52) U.S. Cl.
CPC ........... *H04R 1/105* (2013.01); *H04R 1/1041* (2013.01); *H04R 5/0335* (2013.01); *H04R 1/1008* (2013.01); *H04R 2201/105* (2013.01)

(58) Field of Classification Search
CPC .... H04R 1/1008; H04R 1/1041; H04R 1/105; H04R 5/0335; H04R 2201/105; A61B 2562/0247; A61B 5/6803; A61B 5/6898
See application file for complete search history.

(56) References Cited

U.S. PATENT DOCUMENTS 9,609,921 B1 4/2017 Feinstein
10,849,556 B2 * 12/2020 Lumme ................ A61B 5/1118
(Continued)

FOREIGN PATENT DOCUMENTS

EP 3954281 A1 2/2022
JP 2009-290621 A 12/2009
(Continued)

OTHER PUBLICATIONS

International Search Report and Written Opinion of PCT Application No. PCT/JP2023/010415, issued on Jun. 13, 2023, 9 pages of ISRWO.

*Primary Examiner* — Huyen D Le
(74) *Attorney, Agent, or Firm* — CHIP LAW GROUP

(57) ABSTRACT

A wearable device of which a degree of tightening can be adjusted using electronic control is provided. A wearable device includes a frame that is curved along a longitudinal direction of the frame and of which a degree of curvature is changeable; a plurality of first wires arranged in a widthwise direction of the frame, each of the plurality of first wires being supported to be provided to the frame along the longitudinal direction, each of the plurality of first wires being made of a shape memory alloy of which a length is made smaller when the shape memory alloy reaches a first temperature or above due to being energized; and a control- (Continued)

ler that receives first information and is capable of controlling energization of a first wire of the plurality of first wires on the basis of the first information, the control of the energization enabling the degree of curvature of the frame to be adjusted.

13 Claims, 14 Drawing Sheets

(56) References Cited

U.S. PATENT DOCUMENTS

| | | | | |
|---|---|---|---|---|
| 2016/0366506 | A1* | 12/2016 | Kim | H04R 1/105 |
| 2017/0023971 | A1* | 1/2017 | Lee | G02C 5/20 |

FOREIGN PATENT DOCUMENTS

| | | | |
|---|---|---|---|
| JP | 2013-183368 | A | 9/2013 |
| WO | 2016/021113 | A1 | 2/2016 |

* cited by examiner

WEARABLE DEVICE

CROSS REFERENCE TO RELATED APPLICATIONS

This application is a U.S. National Phase of International Patent Application No. PCT/JP2023/010415 filed on Mar. 16, 2023, which claims priority benefit of Japanese Patent Application No. JP 2022-057318 filed in the Japan Patent Office on Mar. 30, 2022. Each of the above-referenced applications is hereby incorporated herein by reference in its entirety.

TECHNICAL FIELD

The present technology (the technology according to the present disclosure) relates to a wearable device, and in particular, to a wearable device of which a degree of tightening is changeable.

BACKGROUND ART

Conventionally, in some cases, a headphone including a pair of speaker units coupled to each other using a headband includes a stabilizer that is made of a shape memory alloy and attached near ends of the headband, where a shape of the alloy is stored such that the alloy is in an arched shape (for example, Patent Literature 1).

CITATION LIST

Patent Literature

Patent Literature 1: Japanese Patent Application Laid-open No. 2009-290621

DISCLOSURE OF INVENTION

Technical Problem

The stabilizer described above is used as a plate structural support used to maintain an arched shape, and the stabilizer itself is not driven. It is an object of the present technology to provide a wearable device of which a degree of tightening can be adjusted using electronic control.

Solution to Problem

A wearable device according to an embodiment of the present technology includes a frame that is curved along a longitudinal direction of the frame and of which a degree of curvature is changeable; a plurality of first wires arranged in a widthwise direction of the frame, each of the plurality of first wires being supported to be provided to the frame along the longitudinal direction, each of the plurality of first wires being made of a shape memory alloy of which a length is made smaller when the shape memory alloy reaches a first temperature or above due to being energized; and a controller that receives first information and is capable of controlling energization of a first wire of the plurality of first wires on the basis of the first information, the control of the energization enabling the degree of curvature of the frame to be adjusted.

MODE(S) FOR CARRYING OUT THE INVENTION

Favorable embodiments for carrying out the present technology will now be described below with reference to the drawings. Note that the embodiments described below are examples of representative embodiments of the present technology, and the scope of the present technology is not construed as being limited to the embodiments.

In the following description in the figures, the same or similar portions will be denoted by the same or similar reference symbols. However, it should be noted that the figures are schematic ones, and, for example, a relationship between the thickness and a planar dimension and a ratio of thicknesses of respective layers are respectively different from the actual ones. Thus, particular thicknesses and dimensions should be determined in consideration of the following description. Further, of course, a certain figure and another figure have different dimensional relationships and different ratios of dimensions with respect to the same portion.

Furthermore, the embodiments described below are used to describe examples of an apparatus or method used to specify the technical idea of the present technology. The technical idea of the present technology does not specify the following examples as, for example, the material, the shape, the structure, and the arrangement of a structural component. Various modifications may be made to the technical idea of the present technology within the technical scope according to an embodiment of the present technology.

The description is made in the following order.

1. First Embodiment
2. Second Embodiment
3. Third Embodiment
4. Fourth Embodiment

First Embodiment

In this embodiment, an example in which the present technology is applied to a head-mounted wearable device is described. The head-mounted wearable device is a device, such as a headphone or goggles, that is worn on a head of a wearer. In the present embodiment, a headphone is described as an example. Note that the wearable device to which the present technology can be applied is not limited to a wearable device that is worn on the head. For example, the present technology can also be applied to wearable devices that are worn on body parts of a living body, such as a hand, a wrist, a leg, an ankle, a waist, and a breast, that are other than a head of the living body.

«Overall Configuration of Headphone»

Figure 1:
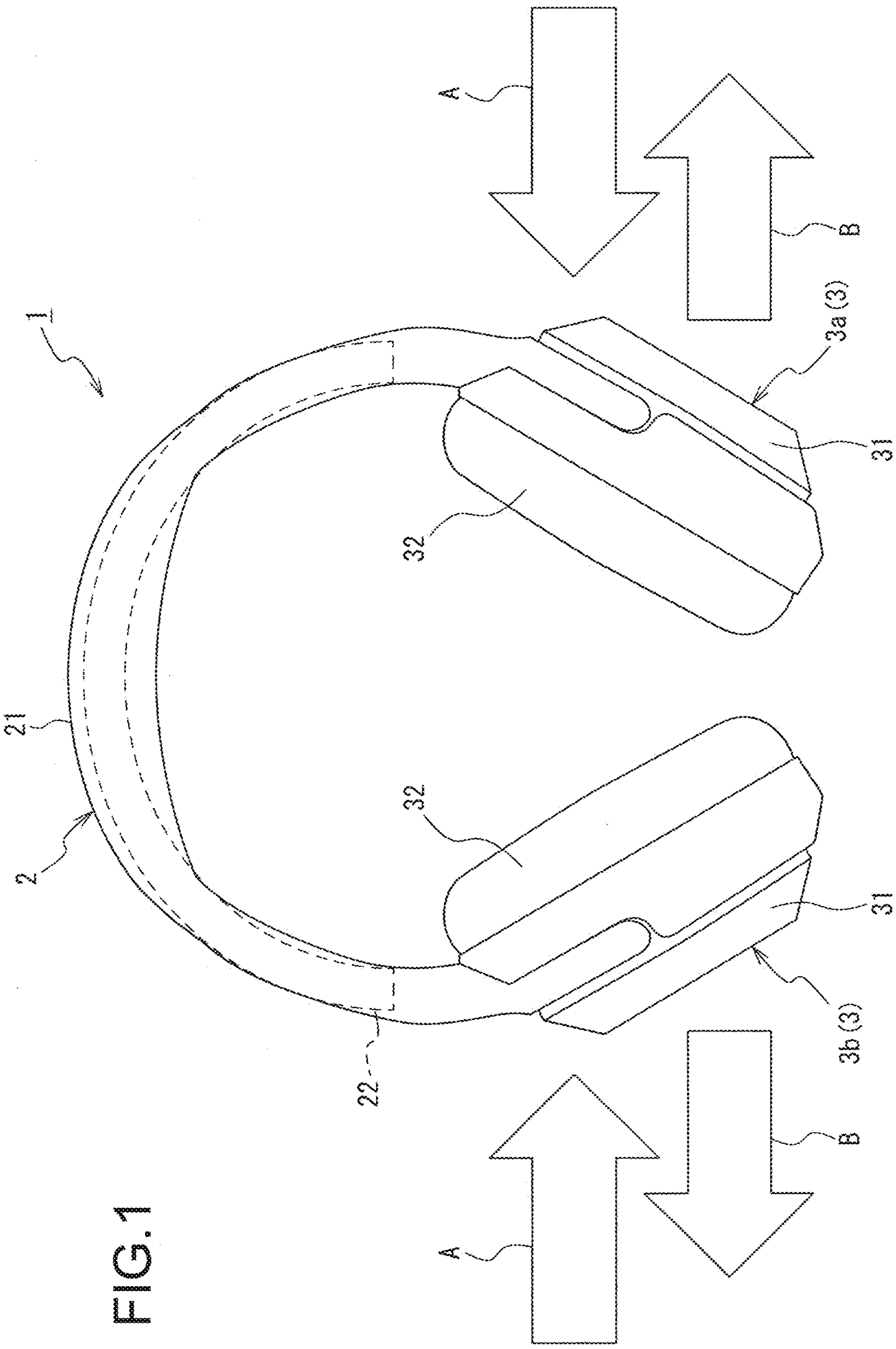
FIG. 1 is a front view illustrating a configuration of a headphone according to a first embodiment.

As illustrated in FIG. 1, a headphone 1 includes a headband 2, a right-ear headphone unit 3*a*, and a left-ear headphone unit 3*b*, the right-ear headphone unit 3*a* and left-ear headphone unit 3*b* being respectively supported to be provided at ends of the headband 2. The right-ear headphone unit 3*a* and the left-ear headphone unit 3*b* may each be simply referred to as a headphone unit 3 when they are not particularly to be distinguished.

<Headphone Unit>

The headphone unit 3 includes a housing 31, a speaker (not illustrated) that is accommodated in the housing 31, and an ear pad 32. The speaker includes an oscillator that generates oscillation, and can drive the oscillator according to a sound signal input to the headphone 1. The headphone 1 includes a wireless communication section 28*a* described later, and the headphone 1 can receive a sound signal transmitted wirelessly from the outside and reproduce the received sound signal. Further, a cable is inserted into the headphone 1, and the headphone 1 can also receive a sound signal via the cable and reproduce the received sound signal. The respective ear pads 32 are provided to the housing 31 such that the headphone unit 3*a* and the headphone unit 3*b* face each other. For example, the ear pad 32 is made of, for example, a flexible material such as urethane, and synthetic leather that covers the flexible material, and the ear pad 32 is airtight and flexible, although the ear pad 32 is not limited thereto.

<Headband and Actuator>

Figure 2:
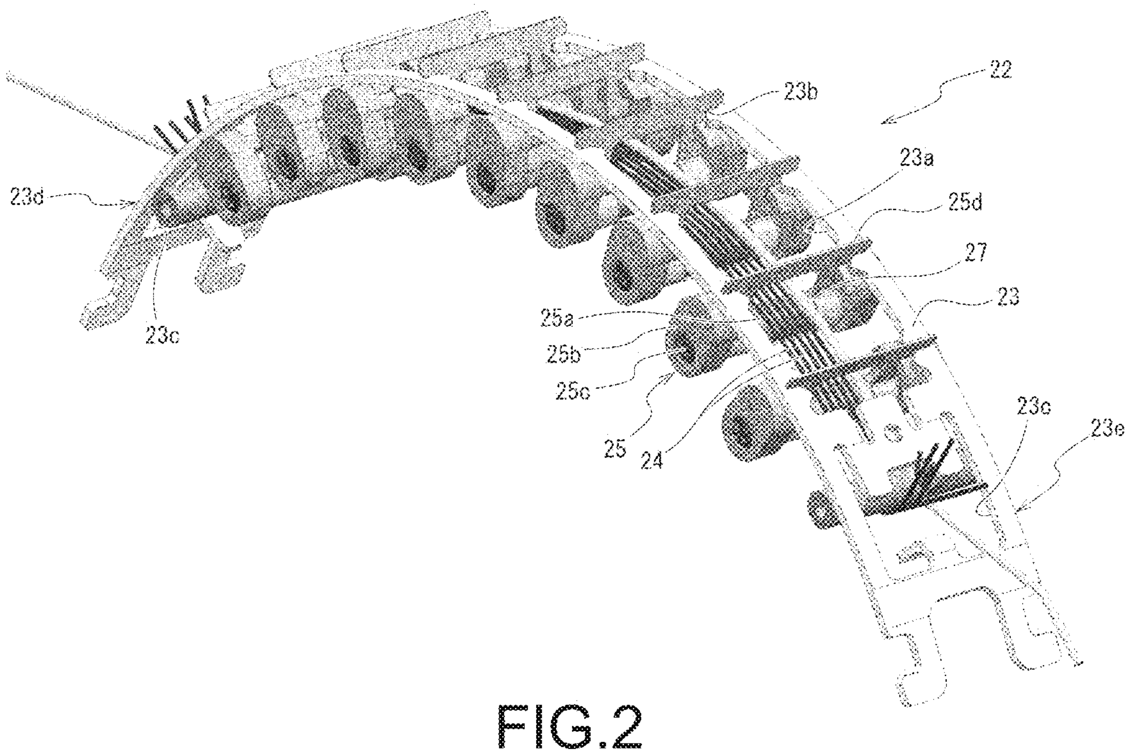
FIG. 2 is a perspective view illustrating a configuration of an actuator that is included in the headphone according to the first embodiment.
Figure 5:
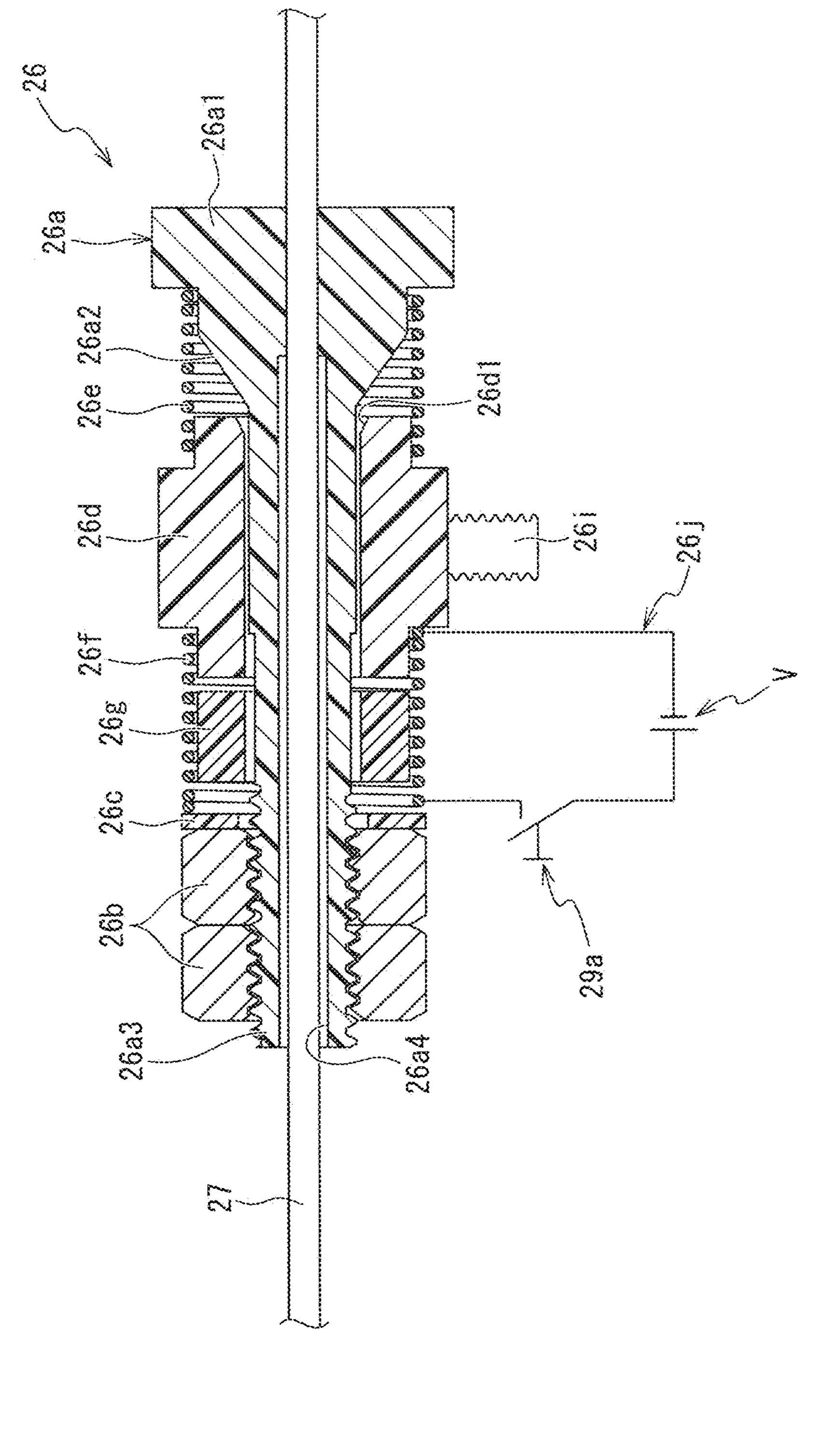
FIG. 5 illustrates a configuration of a longitudinal cross section of a locking mechanism included in the headphone according to the first embodiment.

As illustrated in FIG. 1, the headband 2 includes a casing 21 and an actuator 22 that is accommodated in the casing 21. The actuator 22 curves along a longitudinal direction of the actuator 22, and includes a function of pressing the headphone unit 3 against a wearer in a direction indicated by an arrow A. A degree of curvature (a degree of tightening) of the headband 2 can be changed by a degree of curvature of the actuator 22 being changed. As illustrated in FIGS. 2 and 5, the actuator 22 includes a frame 23, first wires 24, supports 25, a locking mechanism 26, and a second wire 27.

<Frame>

As illustrated in FIG. 2, the frame 23 is formed by punching being performed on a metallic flat plate. A longitudinally long opening 23*a* is punched in a center portion of the frame 23. Further, pluralities of pairs of notches 23*b* are equally spaced longitudinally on a longitudinally extending inner surface of the opening 23*a*. An opening 23*c* of which the first wires 24 and the second wire 27 are pulled out, is punched in a portion, in the frame 23, that is situated adjacent to each of two longitudinally situated ends of the opening 23*a*. Portions, in the frame 23, that are respectively situated around the openings 23*c* are respectively referred to as an end 23*d* and an end 23*e*. The end 23*d* and the end 23*e* are one of and another of longitudinally situated ends of the frame 23.

The frame 23 is curved along a longitudinal direction of the frame 23, and a degree of curvature of the frame 23 is changeable. The frame 23 is elastic in an orientation of the curve, and the degree of curvature of the frame 23 can be adjusted using the first wire 24. Examples of metal of which the frame 23 is made include stainless and iron. The present embodiment is described on the assumption that the frame 23 is made of stainless.

<Support>

Figure 3:
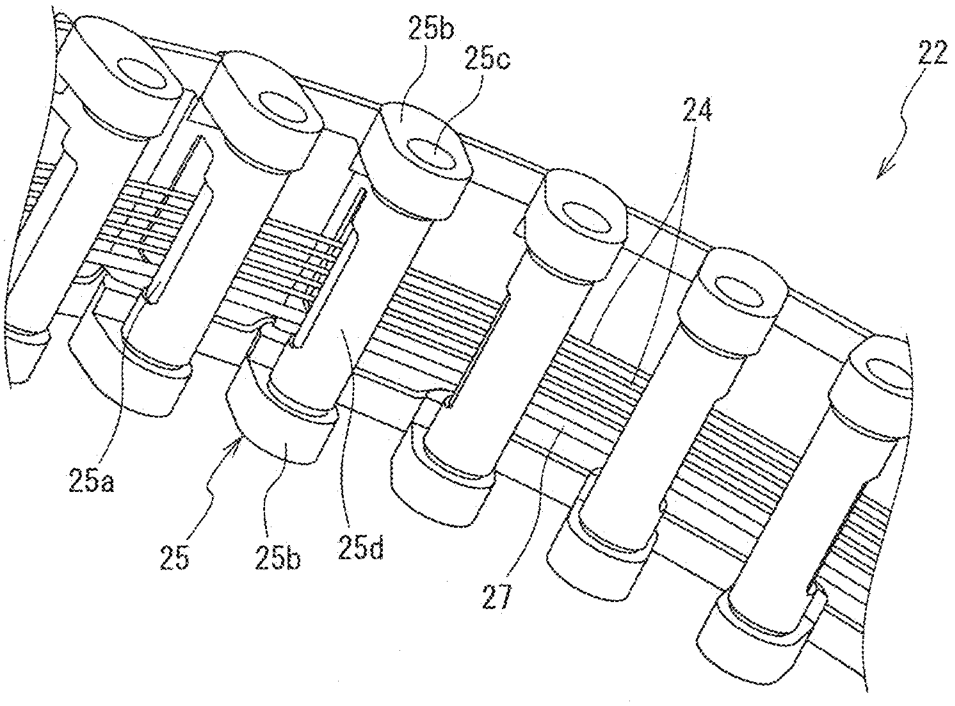
FIG. 3 is a perspective view of an enlarged portion of the actuator included in the headphone according to the first embodiment, as viewed from the side of the head.
Figure 4:
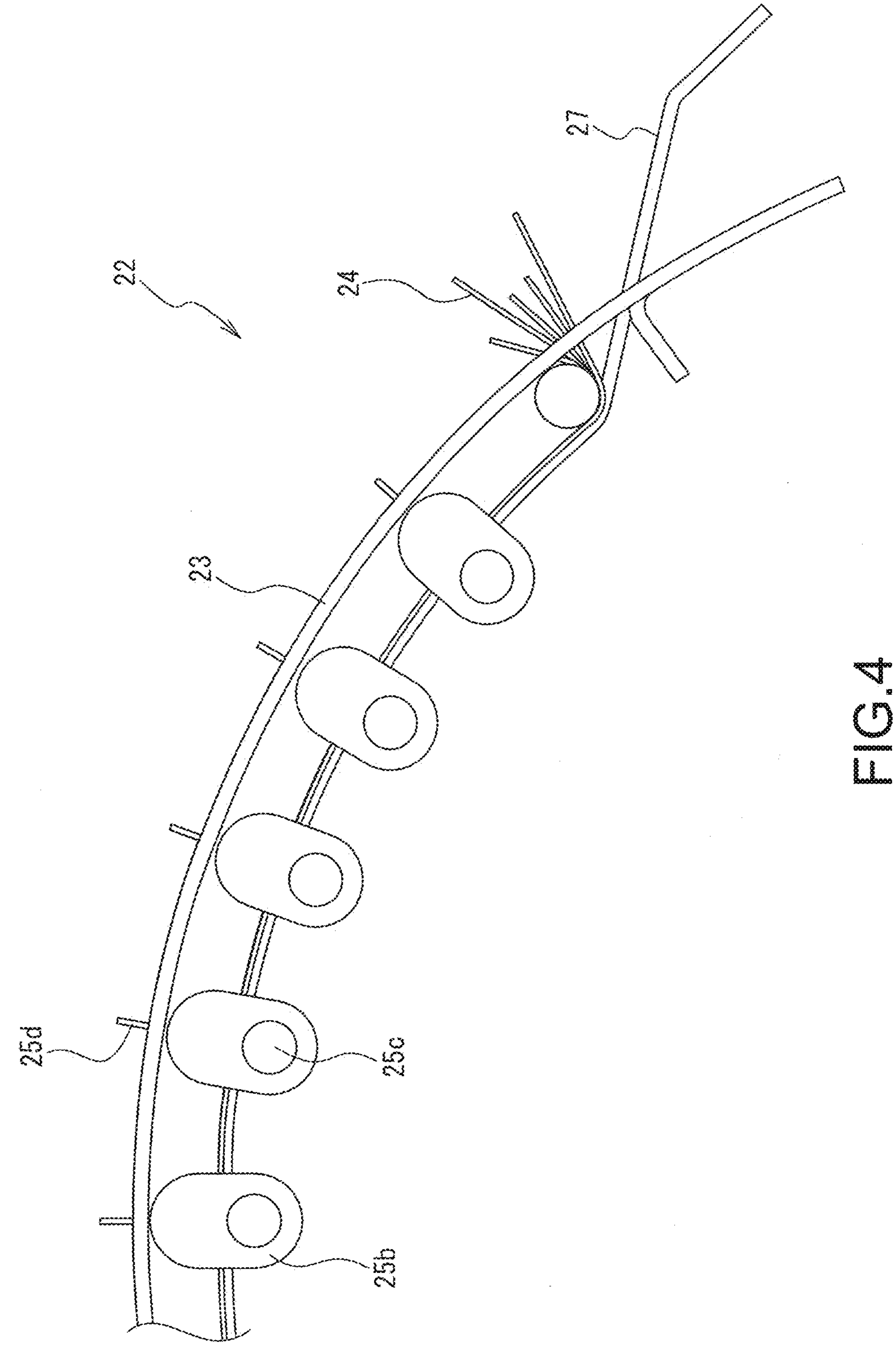
FIG. 4 is a side view illustrating a configuration of a portion of the actuator included in the headphone according to the first embodiment.

As illustrated in FIGS. 2, 3, and 4, the first wire 24 is supported using the support 25 to be provided to the frame 23. The support 25 includes a cylindrical member 25*a* that supports the first wire 24 from the inside, a spacer 25*b* that holds the cylindrical member 25*a* at a specified distance from the frame 23, a screw 25*c* that fixes the spacer 25*b* to the cylindrical member 25*a*, and a support plate 25*d* that fixes the cylindrical member 25*a* to the frame 23.

The cylindrical member 25*a* is provided to the frame 23 on the side of the head (provided on the side of an inner periphery of the frame 23). The cylindrical member 25*a* is a cylindrical member made of an insulating material, and a peripheral surface of the cylindrical member 25*a* supports the first wire 24 and the second wire 27. More specifically, a portion of the peripheral surface of the cylindrical member 25*a* that is situated closer to the frame 23 supports the first wire 24 and the second wire 27. Examples of the insulating material of which the cylindrical member 25*a* is made include resin such as Bakelite and plastic, and ceramics. The present embodiment is described on the assumption that the cylindrical member 25*a* is made of Bakelite.

A longitudinal direction of the spacer 25*b* extends in parallel with a direction in which the spacer 25*b* gets away from the frame 23. Further, using the screw 25*c*, an end of the cylindrical member 25*a* is fixed to a portion of the spacer 25*b* that is situated closer to one of longitudinally situated ends of the spacer 25*b* that is distant from the frame 23. The support 25 includes two spacers 25*b*, and the two spacers 25*b* are respectively fixed to one of and another of the ends of the cylindrical member 25*a*. The cylindrical member 25*a* can be spaced from the frame 23 using the spacers 25*b*. Consequently, the first wire 24 and the second wire 27 are supported in a state of being spaced from the frame 23. The spacer 25*b* is made of an insulating material. Examples of the insulating material of which the spacer 25*b* is made include resin such as Bakelite. The present embodiment is described on the assumption that the spacer 25*b* is made of Bakelite.

The support plate 25*d* is provided to be used to attach the cylindrical member 25*a* to the frame 23. An upper portion of the support plate 25*d* is fixed to a pair of notches 23*b* by being fitted into the pair of notches 23*b* from a side opposite to the side of the head. The upper portion of the support plate 25*d* has a width larger than a distance between paired notches 23*b*. A portion of the peripheral surface of the cylindrical member 25*a* that is situated opposite to the frame 23 is supported by a lower portion of the support plate 25*d*. This portion of the cylindrical member 25*a* may be covered with the support plate 25*d* since this portion of the cylindrical member 25*a* is a portion that does not support the first wire 24 or the second wire 27. An opening is provided to a middle portion of the support plate 25*d* that is situated between the upper portion and the lower portion of the support plate 25*d*. The first wire 24 and the second wire 27 pass through the opening, and a portion of the cylindrical member 25*a* that supports the first wire 24 and the second wire 27 is exposed from the opening. Such a configuration results in preventing the first wire 24 and the second wire 27 from coming into contact with the support plate 25*d*. Further, the middle portion of the support plate 25*d* includes a function of holding the cylindrical member 25*a* at a specified distance from the frame 23, as the spacer 25*b* does. More specifically, the middle portion of the support plate 25*d* extends toward the frame 23 from the cylindrical member 25*a*, and the length of the extending portion holds the cylindrical member 25*a* at a specified distance from the frame 23. The support plate 25*d* is made of metal. Examples of the metal of which the support plate 25*d* is made include stainless and iron. The present embodiment is described on the assumption that the support plate 25*d* is made of stainless.

<First Wire>

Figure 6:
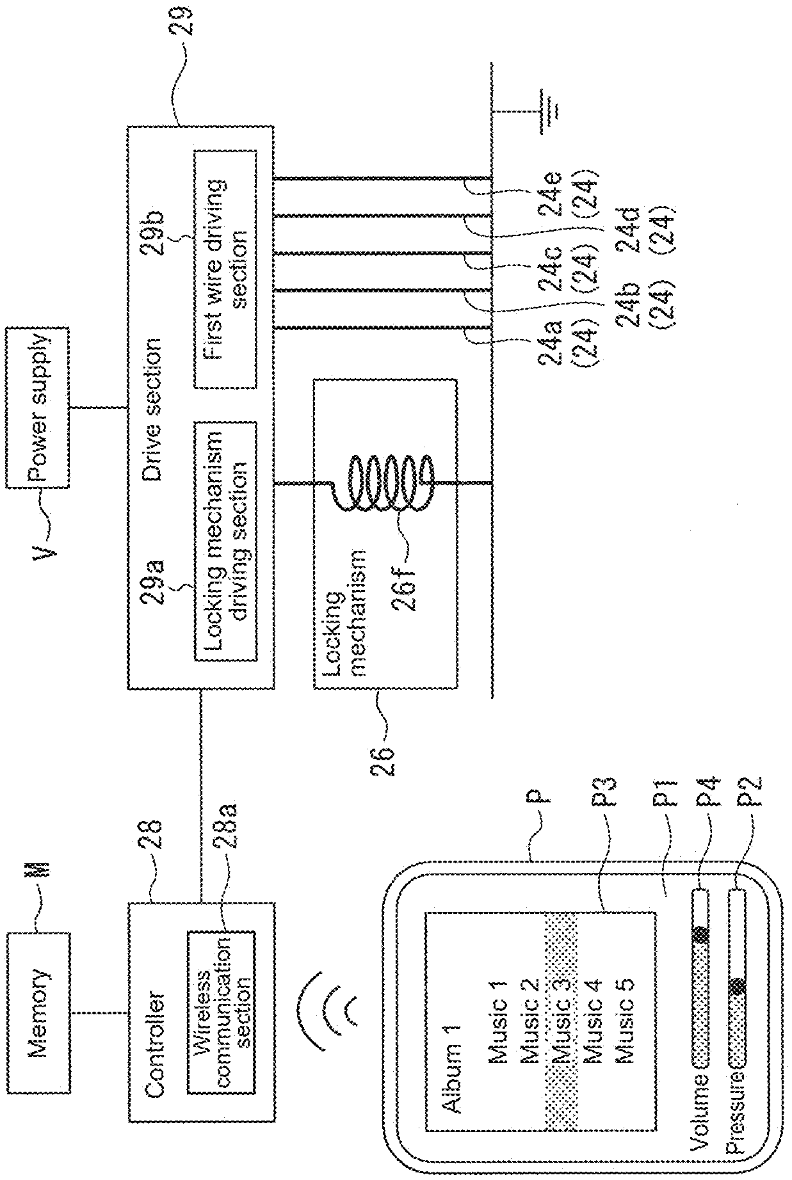
FIG. 6 is a diagram used to describe an overall functional configuration that includes the headphone according to the first embodiment and a terminal.

As illustrated in FIGS. 2 to 4, the first wire 24 is supported to be provided to the frame 23 along the longitudinal direction of the frame 23. The first wire 24 is supported by a plurality of supports 25 equally spaced from each other to be provided to the frame 23. More specifically, the first wire 24 passes between the frame 23 and the cylindrical member 25*a*, and is supported by a portion of the peripheral surface of the cylindrical member 25*a* that is situated closer to the frame 23. In other words, the first wire 24 is arranged closer to the head than the frame 23. A plurality of first wires 24 is provided. The first wires 24 of the plurality of first wires 24 are spaced from each other in a widthwise direction of the frame 23. In the present embodiment, an example in which five first wires that are first wires 24*a*, 24*b*, 24*c*, 24*d*, and 24*e* are provided is described, as illustrated in FIG. 6. Note that the first wires 24*a*, 24*b*, 24*c*, 24*d*, and 24*e* are each simply referred to as the first wire 24 when they are not particularly to be distinguished. Further, the number of first wires 24 is not limited to five, and may be four, or six or more.

As illustrated in FIG. 2, two ends of the first wire 24 each pass through a corresponding opening 23*c* to be pulled out of the frame 23 on the side opposite to the side of the head. The end of the first wire 24 on the left in FIG. 2 is fixed to the end 23*d* of the frame 23, and the end of the first wire 24 on the right in FIG. 2 is fixed to the end 23*e* of the frame 23. The first wire 24 is fixed between the end 23*d* and the end 23*e* in a state of having a specified tension, not in a loose state. Without being limited thereto, for example, one of the ends of the first wire 24 may be fixed to the end 23*d* using a member such as a coil spring, another of the ends of the first wire 24 may be fixed to the end 23*e* using a member such as a worm gear, and the tension described above may be obtained by the first wire 24 being pulled by these members.

The first wire 24 is a wire that is made of a shape memory alloy of which a length is made smaller when the shape memory alloy reaches a first temperature or above due to being energized. The first temperature is, for example, a phase transition temperature specific to a material of which the shape memory alloy is made. Examples of the shape memory alloy include nickel titanium (NiTi) and nickel titanium copper (NiTiCu), although the shape memory alloy is not limited thereto.

The present embodiment is described on the assumption that the first wire 24 has a first length when the temperature of the first wire 24 is lower than the first temperature and that the first wire 24 has a second length smaller than the first length when the temperature of the first wire 24 is higher than or equal to the first temperature. The first wire 24 is supported to be provided to the frame 23 in a state of having tension when the temperature of the first wire 24 is lower than the first temperature. When the first wire 24 is energized in this state to increase the temperature of the first wire 24 up to the first temperature or above, the length of the first wire 24 is changed from the first length to the second length. Then, the length of the first wire 24 is changed from the first length to the second length, and the end 23*d* and the end 23*e* of the frame 23 are pulled to be closer to each other. This results in a higher degree of curvature of the frame 23. Accordingly, a pressure is caused that presses the headphone unit 3 against a wearer in the direction indicated by the arrow A illustrated in FIG. 1.

Figure 7:
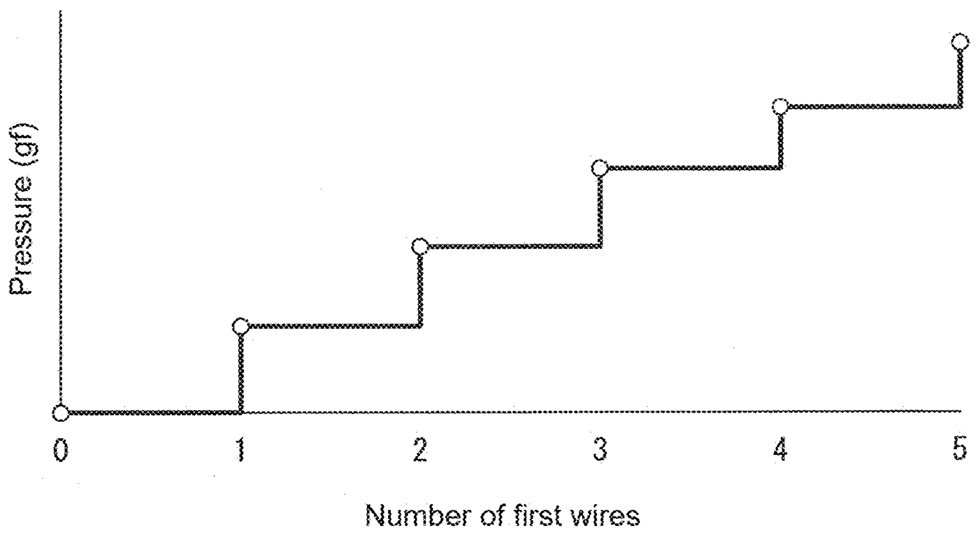
FIG. 7 illustrates a relationship between the number of first wires energized and a caused pressure.

Further, a change in the number of first wires 24 to be energized from among a plurality of first wires 24 included in the actuator 22 makes it possible to change a degree of a pressure applied when the headphone unit 3 is pressed against a wearer. For example, the degree of the pressure applied when the headphone unit 3 is pressed against a wearer (a degree of a pressure (gf) caused by one of the two headphone units 3) is changed stepwise according to the number of first wires 24 energized, as illustrated in FIG. 7. The pressure applied when the headphone unit 3 is pressed against a wearer can be increased in multiple stages in the direction indicated by the arrow A illustrated in FIG. 1 by the number of first wires 24 energized being increased, and the pressure applied when the headphone unit 3 is pressed against a wearer can be reduced in multiple stages in a direction indicated by an arrow B by the number of first wires 24 energized being reduced.

A larger number of first wires 24 included results in a higher upper limit of the pressure applied when the headphone unit 3 is pressed against a wearer. Further, a smaller diameter of the first wire 24 results in a shorter time necessary for the temperature of the first wire 24 to return from a temperature higher than or equal to the first temperature to a temperature lower than or equal to the first temperature after the first wire 24 is de-energized. This makes it possible to being more reactive with respect to control of the degree of curvature of the frame 23. For example, the case in which a wearer performs an operation of increasing pressure but the pressure is desired to be slightly reduced since the pressure is too high, is discussed. When the diameter of the first wire 24 is made smaller, this makes it possible to shorten the time to release heat and decrease the temperature of the first wire 24. This makes it possible to shorten the time necessary to reduce the pressure. Further, the diameter of the first wire 24 is made smaller and as many first wires 24 as possible are used in the form of an array. This makes it possible to make a size of the step smaller, and thus to control pressure more accurately.

<Locking Mechanism and Second Wire>

The locking mechanism 26 is provided in order to maintain the degree of curvature of the frame 23 without the first wire 24 being continuously energized. The temperature of the first wire 24 is increased due to the first wire 24 being energized. Consequently, the first wire 24 has the second length. When the first wire 24 is de-energized, the temperature of the first wire 24 is decreased, and the length of the first wire 24 returns to the first length from the second length. Consequently, the degree of curvature of the frame 23 also returns to a state before the energization. Thus, the locking mechanism 26 is used such that the degree of curvature of the frame 23 upon energization does not return to a previous one. The locking mechanism 26 changes a state of the second wire 27 to a fixed state or a non-fixed state such that the degree of curvature of the frame 23 upon energization does not return to a previous one. Further, the locking mechanism 26 is fixed to the end 23*d* of the frame 23 using, for example, a screw 26*i* illustrated in FIG. 5. Furthermore, a member, from among members included in the locking mechanism 26, that is in contact with a second spring 26*f* is made of resin that is a non-conductive material such as Bakelite.

In this embodiment, a structure similar to a structure used for a known mechanism that adjusts the length of lead is used for the locking mechanism 26, as illustrated in FIG. 5, the known mechanism being adopted for mechanical pencils that are writing materials. Specifically, the locking mechanism 26 includes a body 26*a* that is formed by a large diameter portion 26*a*1, a tapered portion 26*a*2, and a small diameter portion 26*a*3 being coupled to each other in this order, and a through-hole 26*a*4 that passes through the body 26*a* is formed in the center of the body 26*a*. The second wire 27 passes through the through-hole 26*a*4.

The large diameter portion 26*a*1 and the tapered portion 26*a*2 are circumferentially divided into three portions in a state of being spaced equally. The tapered portion 26*a*2 is connected to the small diameter portion 26*a*3.

The small diameter portion 26*a*3 has an elongated cylindrical shape. A male screw is formed in a tip portion of the small diameter portion 26*a*3, and two nuts 26*b* are put around the male screw. The two nuts 26*b* are put around the male screw in a state of pushing each other. This results in the two nuts 26*b* not easily moving in an axial direction.

A washer 26*c* is in contact with an end surface of the nuts 26*b* that is situated on the side of the large diameter portion 26*a*1. A cylindrical movable portion 26*d* that surrounds a portion of the small diameter portion 26*a*3 that is closer to the large diameter portion 26*a*1, is provided on a side of the tapered portion 26*a*2 that is closer to the nuts 26*b*, such that the movable portion 26*d* can move in a longitudinal direction of the second wire 27.

The movable portion 26*d* includes two end portions each having a smaller diameter than a center portion of the movable portion 26*d*. One of the end portions that is situated closer to the large diameter portion 26*a*1 is fitted into one of ends of a first spring 26*e* that is a coil spring, and another of the ends of the first spring 26*e* is in contact with a surface of the large diameter portion 26*a*1 while surrounding the tapered portion 26*a*2.

Another of the end portions of the movable portion 26*d* that is situated closer to the nuts 26*b* is fitted into one of ends of the second spring 26*f* corresponding to a coil spring, and another of the ends of the second spring 26*f* is in contact with a surface of the washer 26*c*.

Each of the first spring 26*e* and the second spring 26*f* is placed at a corresponding arrangement position in a state of being further compressed, compared to an unloaded state. Thus, the movable portion 26*d* is placed in the longitudinal direction of the second wire 27 such that elastic forces of the first spring 26*e* and the second spring 26*f* in a pressing direction are in balance. Note that a small cylindrical member 26*g* that guides the second spring 26*f* such that a shape of the second spring 26*f* is not distorted, is arranged inside of the second spring 26*f*.

The first spring 26*e* is a normal coil spring having a fixed spring constant. For example, a coil spring that uses a stainless wire is applied as the first spring 26*e*.

On the other hand, the second spring 26*f* is a coil spring that uses a wire made of a shape memory alloy. The second spring 26*f* is configured such that a coil length of the second spring 26*f* is made smaller than the coil length at a room temperature when the second spring 26*f* reaches the first temperature or above due to being energized. Note that the present embodiment is described on the assumption that a material of which the second spring 26*f* is made is similar to the material of which the above-described first wire 24 is made. However, the material of the second spring 26*f* may be different from the material of the first wire 24.

The second wire 27 is supported using the support 25 to be provided to the frame 23, as in the case of the first wire 24. Two ends of the second wire 27 each pass through a corresponding opening 23*c* to be pulled out of the frame 23 on the side opposite to the side of the head. The end (one of the ends) of the second wire 27 on the left in FIG. 2 passes through the through-hole 26*a*4 of the body 26*a*, and the end (another of the ends) of the second wire 27 on the right in FIG. 2 is fixed to the end 23*e* of the frame 23. Note that the end (the other of the ends) of the second wire 27 on the right in FIG. 2 may be fixed to the end 23*e* of the frame 23 using a member such as a coil spring. The second wire 27 in the non-fixed state can be moved through the through-hole 26*a*4. The second wire 27 in the fixed state is caught in the large diameter portion 26*a*1 and the tapered portion 26*a*2, and is not allowed to be moved through the through-hole 26*a*4. A degree of surface roughness of the second wire 27 may be adjusted to be low such that the second wire 27 in the non-fixed state can be easily moved through the through-hole 26*a*4. The second wire 27 may be made of, for example, polymer resin (such as acrylic and nylon) or fiber made of a natural material, although the second wire 27 is not limited thereto. The second wire 27 is not made of a shape memory alloy. Thus, even if the length of the second wire 27 is changed when the temperature of the second wire 27 exceeds or falls below the first temperature, the change will be very small.

Switching between the fixed state and the non-fixed state of the second wire 27 is described below. FIG. 5 illustrates a state in which the temperature of the second spring 26*f* is increased due to being energized and the coil length of the second spring 26*f* is made smaller. When the coil length of the second spring 26*f* is made smaller, the movable portion 26*d* and the tapered portion 26*a*2 are separate from each other, a tapered surface 26*d*1 of the movable portion 26*d* and the tapered portion 26*a*2 are separated from each other, and the catch of the second wire 27 in the large diameter portion 26*a*1 and the tapered portion 26*a*2 is released. This results in the second wire 27 being in the non-fixed state. When the second spring 26*f* is de-energized in this state, the temperature of the second spring 26*f* is decreased, and the coil length of the second spring 26*f* is made larger. When the coil length of the second spring 26*f* is made larger, the movable portion 26*d* and the tapered portion 26*a*2 get close to each other, the tapered surface 26*d*1 of the movable portion 26*d* and the tapered portion 26*a*2 come into contact with each other, and the second wire 27 is caught in the large diameter portion 26*a*1 and the tapered portion 26*a*2. This results in the second wire 27 being in the fixed state.

«Electrical Configuration of Headphone»

The actuator 22 of the headphone 1 is electronically controlled. As illustrated in FIG. 6, the headphone 1 includes a controller 28, a drive section 29, a power supply V, and a memory M. The controller 28 receives first information from a terminal P.

«Controller»

The controller 28 is a control function. The controller 28 is implemented by, for example, a microcomputer (a microcontroller) or a controller such as a processor, although the controller 28 is not limited thereto. The controller 28 includes the wireless communication section 28*a*. The controller 28 includes a function of receiving first information from the terminal P using wireless communication performed by the wireless communication section 28*a* and of controlling energization of the first wire 24 on the basis of the received first information. This results in adjusting the degree of curvature of the frame 23. More specifically, the controller 28 includes a function of controlling the drive section 29 on the basis of the first information to control energization of the first wire 24. The first information is information that is received by the terminal P and indicates a target value that is used to change a degree of pressure. The target value used to change a degree of pressure is referred to as a first pressure. On the basis of the received first information, the controller 28 determines the number of first wires 24 to be energized from among the included first wires 24, and controls the drive section 29 such that the determined number of first wires 24 are energized.

Here, a value of the pressure applied when the headphone unit 3 is pressed against a wearer is changed according to the number of first wires 24 energized, as illustrated in FIG. 7. More specifically, when there is an increase in the number of first wires 24 energized, the pressure applied when the headphone unit 3 is pressed against a wearer is increased stepwise. Further, when there is a reduction in the number of first wires 24 energized, the pressure applied when the headphone unit 3 is pressed against a wearer is reduced stepwise. The memory M illustrated in FIG. 6 stores therein a relationship between the number of first wires 24 energized and a caused pressure. Further, the controller 28 determines the number of first wires 24 to be energized on the basis of, for example, the first information and on the basis of the relationship between the number of first wires 24 energized and a caused pressure, although the controller 28 is not limited thereto. Furthermore, the controller 28 includes a function of controlling energization of the second spring 26*f*. In other words, the controller 28 controls the fixed state and the non-fixed state of the second wire 27 using the locking mechanism 26.

The wireless communication performed by the wireless communication section 28*a* is, for example, wireless communication using Bluetooth (registered trademark). The wireless communication performed by the wireless communication section 28*a* is not limited thereto, and any other known communication technologies may be used. Further, the controller 28 may be configured to receive first information using wired communication, not using wireless communication.

<Terminal>

Examples of the terminal P include terminals such as a smartphone and a music player, although the terminal P is not limited thereto. Further, the examples of the terminal P include portable terminals, although the terminal P is not limited thereto. For example, the terminal P includes an image display section P1 that is a touchscreen. The image display section P1 displays thereon a pressure entry screen P2 used to adjust a pressure applied when the headphone unit 3 is pressed against a wearer. The pressure entry screen P2 displays thereon a slide bar, and receives input performed to instruct a change in a degree of pressure by the slide bar being operated. Note that a position of the slide bar after being operated indicates a target value (the first pressure) used to change the degree of pressure. When the slide bar receives input performed to instruct a change in the degree of pressure, the terminal P transmits, as first information, information indicating the first pressure using wireless communication. Then, the controller 28 receives the first information transmitted by the terminal P. Note that the pressure entry screen P2 illustrated in FIG. 6 is an example of a pressure entry screen. In addition to this example, a pressure may be input using figures, or a pressure may be input through a "+" button and a "−" button. Further, a pressure may be input through a button physically provided to the terminal P. Furthermore, the image display section P1 of the terminal P may display thereon, for example, a music selection screen P3 and a volume entry screen P4 in addition to the pressure entry screen P2.

<Drive Section>

The drive section 29 includes a locking mechanism driving section 29*a* and a first wire driving section 29*b*. The locking mechanism driving section 29*a* is a switch provided as a portion of an electric circuit 26*j* that connects the power supply V and second spring 26*f* illustrated in FIG. 5. When the locking mechanism driving section 29*a* is turned on, the power supply V and the second spring 26*f* become electrically continuous with each other to energize the second spring 26*f*. Further, when the locking mechanism driving section 29*a* is turned off, the power supply V and the second spring 26*f* become electrically discontinuous with each other to de-energize the second spring 26*f*. In other words, the second spring 26*f* starts to be energized when the locking mechanism driving section 29*a* is turned on, and the second spring 26*f* is de-energized when the locking mechanism driving section 29*a* is turned off. Further, as illustrated in FIG. 6, the locking mechanism driving section 29*a* is turned on and off under the control of the controller 28.

The first wire driving section 29*b* is a switch provided as a portion of an electric circuit (not illustrated) that connects the power supply V and the first wire 24. When the first wire driving section 29*b* is turned on, the power supply V and the first wire 24 become electrically continuous with each other to energize the first wire 24. Further, when the first wire driving section 29*b* is turned off, the power supply V and the first wire 24 become electrically discontinuous with each other to de-energize the first wire 24. In other words, the first wire driving section 29*b* starts to be energized when the first wire driving section 29*b* is turned on, and the first wire 24 is de-energized when the first wire driving section 29*b* is turned off. Further, the first wire driving section 29*b* is turned on and off under the control of the controller 28.

The first wire driving section 29*b* starts energizing or de-energizes each of the first wires 24*a*, 24*b*, 24*c*, 24*d*, and 24*e*. For example, the first wire driving section 29*b* may only energize one of the first wires 24*a* to 24*e*, or for example, the first wire driving section 29*b* may only energize three of the first wires 24*a* to 24*e*. Further, for example, the first wire driving section 29*b* may energize all of the first wires 24*a* to 24*e*, or the first wire driving section 29*b* may energize none of the first wires 24*a* to 24*e*. For example, such a configuration can be provided by a switch being provided to each of the first wires 24*a* to 24*e*, although the configuration is not limited thereto. Further, how many of the first wires 24*a* to 24*e* is to be energized is dependent on the control of the controller 28.

<Power Supply>

The power supply V includes, for example, a battery and a capacitor. The power supply V may be removable from the headphone 1, or may be fixed to the headphone 1.

<Memory>

The memory M is electrically connected to the controller 28. The memory M is a nonvolatile memory, and is a storage circuit that includes, for example, a read only memory (ROM), an erasable programmable read only memory (PROM), or a flash memory.

«Flow of Control Performed by Controller»

Figure 8:
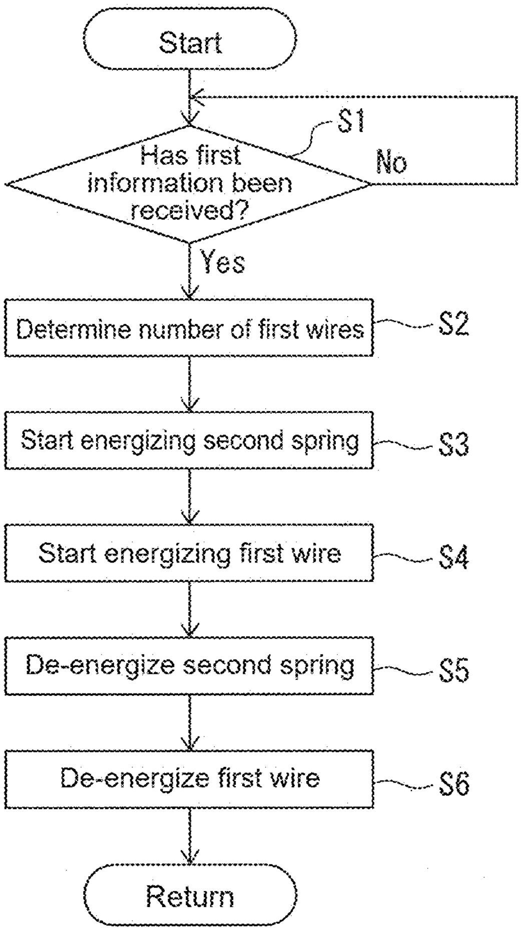
FIG. 8 is a flowchart illustrating a flow of control performed by a controller that is included in the headphone according to the first embodiment.

A flow of control performed by the controller 28 that is illustrated in FIG. 8 is described. The present embodiment is described on the assumption that, for example, an initial state of the headphone 1 worn by a wearer is a state in which the curvature of the headband 2 is gentle. In order to make the curvature of the headband 2 more acute, the wearer slides the slide bar displayed on the pressure entry screen P2 of the terminal P, the slide bar being slid in a direction in which pressure is increased. A position of the slide bar after being operated indicates a target value used to change the degree of pressure (the first pressure). When the terminal P detects input performed on the slide bar displayed on the pressure entry screen P2, the terminal P transmits first information indicating the first pressure.

In Step S1, the controller 28 monitors whether first information has been received. When it has been determined that the first information has not been received (Step S1; No), the controller 28 repeats the process of Step S1. When it has been determined that the first information has been received (Step S1; Yes), the process moves on to Step S2, and the controller 28 determines the number of first wires 24 to be energized. For example, the controller 28 determines the number of first wires 24 to be energized, on the basis of a pressure value (the first pressure) indicated by the received first information, and on the basis of a relationship between the number of first wires 24 energized and a caused pressure, the relationship being stored in the memory M. More specifically, on the basis of the first information, the controller 28 increases the number of first wires 24 to be energized, compared to the initial state, in order to make the curvature of the headband 2 more acute, compared to the headband 2 in the initial state.

Thereafter, the process moves on to Step S3, and the controller 28 starts energizing the second spring 26*f*. More specifically, the controller 28 performs control such that the locking mechanism driving section 29*a* is turned on, and starts energizing the second spring 26*f*. When the second spring 26*f* starts to be energized, the state of the second wire 27 is switched from the fixed state to the non-fixed state. This makes it possible to change the degree of curvature of the headband 2.

Then, the process moves on to Step S4, and the first wire 24 starts to be energized. In other words, the first wire 24 is energized while the second wire 27 is in the non-fixed state. More specifically, from among a plurality of first wires 24 included in the actuator 22, the controller 28 starts energizing the first wires 24 of which the number has been determined in Step S2. This results in changing the length of the energized first wire 24 from the first length to the second length, and in increasing a pressure applied when the headphone unit 3 is pressed against a wearer. Accordingly, the degree of curvature of the headband 2 is changed.

Next, the process moves on to Step S5, and the controller 28 de-energizes the second spring 26*f*. In other words, when adjustment of the degree of curvature of the frame 23 is completed, the state of the second wire 27 is changed to the fixed state using the locking mechanism 26. More specifically, the controller 28 performs control such that the locking mechanism driving section 29*a* is turned off, and de-energizes the second spring 26*f*. When the second spring 26*f* is de-energized, the state of the second wire 27 is switched from the non-fixed state to the fixed state. This makes it possible to prevent the degree of curvature of the headband 2 from being changed even when the length of the first wire 24 returns to the first length, and thus to prevent the pressure applied when the headphone unit 3 is pressed against a wearer from being reduced.

Thereafter, the process moves on to Step S6, and the controller 28 de-energizes the first wire 24. In other words, the first wire 24 is de-energized with the second wire 27 being in the fixed state. More specifically, the controller 28 de-energizes all of the first wires 24. The second wire 27 maintains the pressure applied when the headphone unit 3 is pressed against a wearer. Thus, there is no change in a degree of pressure even when the first wire 24 is de-energized. This makes it possible to reduce power consumption of the first wire 24.

Primary Effects Provided by First Embodiment

The actuator 22 included in the headband 2 of the headphone 1 according to the first embodiment of the present technology includes the frame 23 being curved along the longitudinal direction of the frame 23 and of which a degree of curvature is changeable; a plurality of first wires 24 arranged in the widthwise direction of the frame 23, each of the plurality of first wires 24 being supported to be provided to the frame 23 along the longitudinal direction of the frame 23, each of the plurality of first wires 24 being made of a shape memory alloy of which a length is made smaller when the shape memory alloy reaches the first temperature or above due to being energized; and the controller 28 receiving first information, the controller 28 being capable of controlling energization of the first wire 24 on the basis of the first information, the control of the energization making it possible to adjust the degree of curvature of the frame 23. As described above, the degree of curvature of the headband 2 is electronically controlled by the actuator 22. Thus, a level of comfort obtained when a wearer is wearing the headphone 1 can be easily improved.

Further, in the first embodiment of the present technology, the plurality of first wires 24 each made of a shape memory alloy of which a length is made smaller when the shape memory alloy reaches the first temperature or above due to being energized, is arranged in an array. This makes it possible to perform adjustment to increase or reduce, in multiple stages, the pressure applied when the headphone unit 3 is pressed against a wearer. Consequently, the level of comfort obtained when a wearer is wearing the headphone 1 can be adjusted in multiple stages, and this results in being able to finely provide a wearing comfort according to a taste of the wearer.

Furthermore, in the first embodiment of the present technology, the actuator 22 including a plurality of first wires 24 can be accommodated in the casing 21 of the headband 2, and this results in the actuator 22 having a smaller footprint, compared to an electromagnetic motor that generates an equivalent force. Further, the actuator 22 according to the first embodiment does not produce sound due to running of a motor, which is different from an electromagnetic motor. Thus, the actuator 22 is silent. Consequently, when the present technology is applied to the headphone 1, sound heard from a speaker of the headphone is not blocked.

Moreover, in the first embodiment of the present technology, input performed to instruct a change in a degree of pressure is received through the pressure entry screen P2 of the terminal P. Thus, for example, a wearer can easily give an instruction to change a degree of pressure.

Note that, in the first embodiment, the controller 28 determines the number of first wires 24 to be energized, on the basis of the first pressure indicated by received first information, and on the basis of a relationship between the number of first wires 24 energized and a caused pressure, the relationship being stored in the memory M. However, the present technology is not limited thereto. For example, a range of between a maximum value that can be input through the pressure entry screen P2, and a minimum value that can be input through the pressure entry screen P2 may be equally divided according to the number of first wires 24 included in the actuator 22, where the maximum value corresponds to the case in which all of the first wires 24 are energized, and the minimum value corresponds to the case in which none of the first wires 24 are energized.

Further, the second spring 26*f* is a spring in the form of a coil in the first embodiment. However, the second spring 26*f* may be a leaf spring.

Further, the processes of Steps S3 and S4 may be performed at the same time.

Second Embodiment

A second embodiment of the present technology that is illustrated in FIGS. 9 to 12 is described below. The headphone 1 according to the second embodiment is different from the above-described headphone 1 according to the first embodiment in including a sensor 4 and in automatically adjusting the degree of curvature of the headband 2 on the basis of a value of detection performed by the sensor. Regarding the other points, the headphone 1 has a configuration essentially similar to the configuration of the above-described headphone 1 according to the first embodiment. Note that the already described structural element is denoted by the same reference numeral, and a description thereof is omitted.

«Overall Configuration of Headphone»

Figure 9:
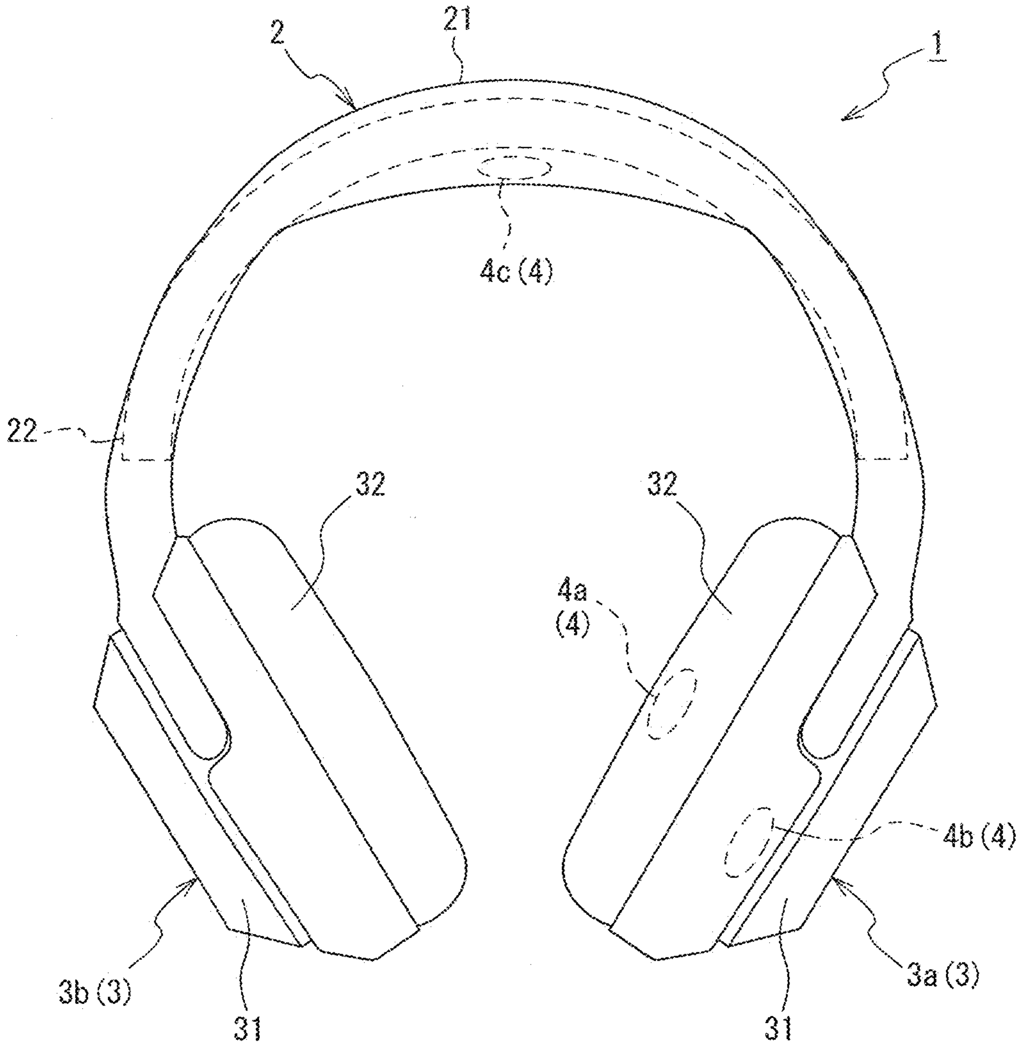
FIG. 9 is a front view illustrating a configuration of the headphone according to a second embodiment.
Figure 10:
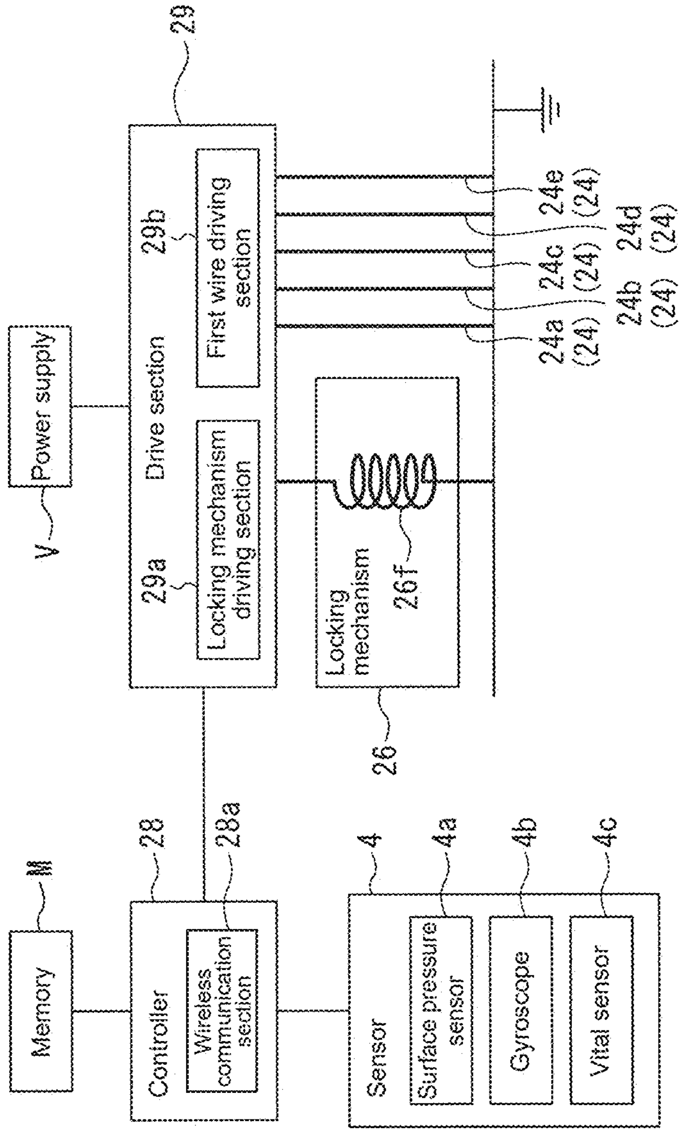
FIG. 10 is a block diagram illustrating a functional configuration of the headphone according to the second embodiment.

As illustrated in FIGS. 9 and 10, the headphone 1 includes the sensor 4. Examples of the sensor 4 include sensors such as a surface pressure sensor 4*a*, a gyroscope 4*b*, and a vital sensor 4*c*, although the sensor 4 is not limited thereto. Note that the surface pressure sensor 4*a*, the gyroscope 4*b*, and the vital sensor 4*c* may each be simply referred to as the sensor 4 when they are not particularly to be distinguished. The sensor 4 detects various information regarding a wearer according to the type of sensor, and outputs information indicating a result of the detection as first information. As illustrated in FIG. 10, the first information is transmitted to the controller 28 by wire. However, the first information may be transmitted wirelessly.

Figure 11:
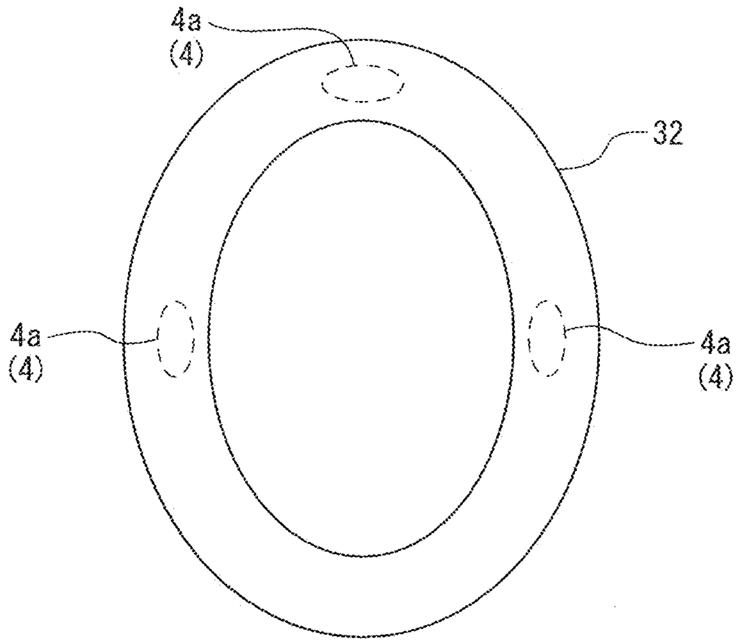
FIG. 11 illustrates an ear pad included in the headphone according to the second embodiment, as viewed from the side of the head.

FIG. 11 illustrates the ear pad 32, as viewed from the side of the head. Three surface pressure sensors 4*a* are provided to the ear pad 32 on the side of the head. Note that the number of surface pressure sensors 4*a* is not limited thereto. Examples of the surface pressure sensor 4*a* include a piezoelectric sensor, a dielectric elastomer actuator (DEA) formed by an elastomer being situated between electrodes, and a pneumatic pressure sensor, although the surface pressure sensor 4*a* is not limited thereto. Note that, when a single ear pad 32 includes a plurality of surface pressure sensors 4*a*, first information may include results of detection performed by all of the surface pressure sensors 4*a*, or may include, for example, an average of the results of detection performed by the surface pressure sensors 4*a*, or a maximum value of the results of detection performed by the surface pressure sensors 4*a*.

As illustrated in FIG. 9, the gyroscope 4*b* is provided in the housing 31 of the ear pad 32. The gyroscope 4*b* is a sensor that detects angular velocity. The gyroscope 4*b* detects, as angular velocity, changes in a rotation of and an orientation of the head of a wearer while the headphone 1 is being worn on the head of the wearer, and outputs a result of the detection as first information in the form of an electric signal. The angular velocity is an angle of rotation per unit time.

The vital sensor 4*c* is provided to the headband 2 on the side of the head. Examples of the vital sensor 4*c* include a pulse sensor, a blood pressure sensor, a blood flow sensor, a brain wave sensor, a sweating sensor, and a temperature sensor, although the vital sensor 4*c* is not limited thereto. The vital sensor 4*c* detects, as vital information regarding a wearer, at least one of pulse, a blood pressure, a blood flow, brain waves, sweating, or a temperature (a surface temperature and a deep-layer temperature).

The controller 28 receives first information transmitted by a sensor. Then, the controller 28 determines a state of a wearer on the basis of the received first information. More specifically, the controller 28 determines a motion state of a wearer on the basis of first information received from the gyroscope 4*b*. Examples of the motion state include states such as being stationary, being seated, running, going up and down a flight of stairs, looking downward, and looking upward, although the motion state is not limited thereto. The controller 28 can determine whether the motion state of a wearer has been changed, on the basis of chronologically received pieces of first information. For example, the controller 28 can determine that the motion state of the wearer has been changed from a state of running to a state of being stopped.

Further, the controller 28 determines a somatopsychic state of a wearer and a degree of the somatopsychic state on the basis of first information received from the vital sensor 4*c*. Examples of the somatopsychic state include states such as a degree of tiredness, comfort/discomfort, a degree of comfort, a degree of discomfort, a degree of relaxing, and a degree of tension, although the somatopsychic state is not limited thereto. For example, when there has been a decrease in at least one of, for example, a pulse rate, a blood pressure, or an amount of sweating of the wearer, or when there has been an increase in at least one of, for example, blood flow or a temperature of the wearer, the controller 28 can determine that a degree of comfort (a degree of relaxing) of a wearer has been increased. Further, for example, when there has been a decrease in at least one of, for example, a pulse rate, a blood pressure, or an amount of sweating of the wearer, or when there has been an increase in at least one of, for example, blood flow or a temperature of the wearer, the controller 28 can determine that a wearer is relaxed or feels comfortable. Furthermore, for example, when there has been an increase in an amount of sweating of the wearer, the controller 28 can determine that a degree of tension of a wearer has been increased. Moreover, for example, when there has been an increase in an amount of sweating of the wearer, the controller 28 can determine that a wearer feels tense. Further, for example, the controller 28 can determine, on the basis of brain waves of a wearer, states of the wearer, such as a degree of tiredness, comfort/discomfort, a degree of comfort, a degree of discomfort, a degree of relaxing, and a degree of tension of the wearer, and an increase or decrease in the degrees. The controller 28 can determine whether the somatopsychic state of a wearer has been changed, on the basis of chronologically received pieces of first information. For example, the controller 28 can determine that the state of a wearer has been changed from a state of not being tired to a state of being tired.

Further, the controller 28 obtains a real-time pressure applied when the headphone unit 3 is pressed against a wearer, on the basis of first information received from the surface pressure sensor 4*a*. The real-time pressure obtained on the basis of the first information received from the surface pressure sensor 4*a* is referred to as a detection pressure. The controller 28 can determine whether the real-time pressure applied to a wearer has been changed, on the basis of chronologically received pieces of first information. For example, the controller 28 can determine, from a decrease in the real-time pressure, that the headphone 1 is nearly dislodged from the wearer.

Further, the controller 28 determines whether to change the degree of pressure applied when the headphone unit 3 is pressed against a wearer, on the basis of the state of the wearer and the detection pressure for the wearer. When the controller 28 has determined that the degree of the pressure applied when the headphone unit 3 is pressed against a wearer is to be changed, the controller 28 determines the number of first wires 24 to be energized from among the included first wires 24, and controls the drive section 29 such that the determined number of first wires 24 are energized.

The controller 28 determines whether to change the degree of the pressure applied when the headphone unit 3 is pressed against a wearer, on the basis of the motion state of the wearer and the detection pressure for the wearer. The controller 28 determines the number of first wires 24 such that the pressure applied when the headphone unit 3 is pressed against a wearer is higher if a degree of the motion state of the wearer is higher.

The controller 28 determines whether to change the degree of the pressure applied when the headphone unit 3 is pressed against a wearer, on the basis of the somatopsychic state of the wearer and the detection pressure for the wearer. The controller 28 adjusts the pressure applied when the headphone unit 3 is pressed against a wearer, such that the wearer gets better. For example, when the wearer is tired or the degree of tiredness is high, the pressure applied when the headphone unit 3 is pressed against the wearer is adjusted to be relaxed, in order not to fasten to the head too tightly. Further, for example, when a wearer is tense or the degree of tension is high, the pressure applied when the headphone unit 3 is pressed against the wearer is adjusted to be relaxed, in order to ease tension. Furthermore, for example, when a wearer feels uncomfortable or the degree of comfort is low, the pressure applied when the headphone unit 3 is pressed against the wearer is adjusted to be relaxed.

«Flow of Control Performed by Controller»

Figure 12:
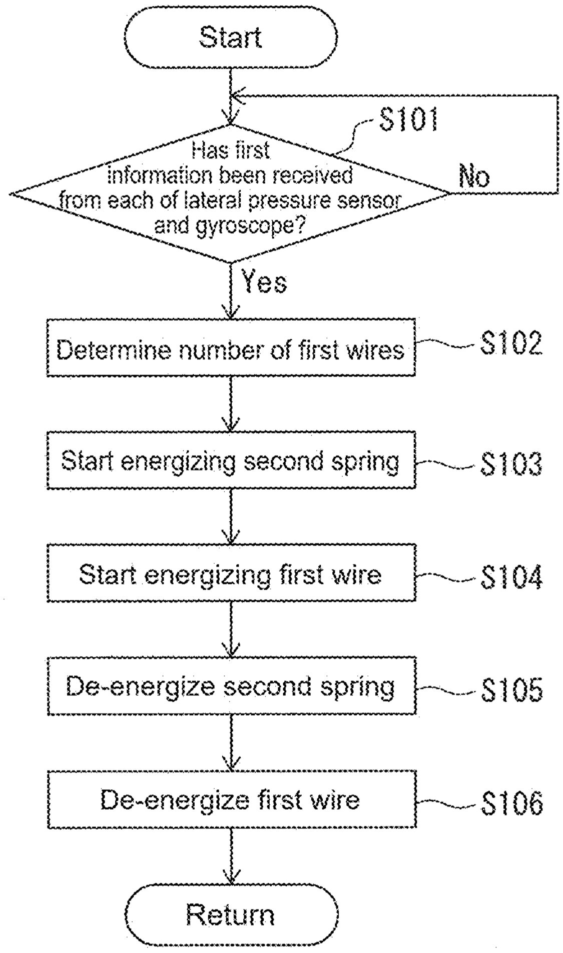
FIG. 12 is a flowchart illustrating a flow of control performed by the controller included in the headphone according to the second embodiment.

A flow of control performed by the controller 28 that is illustrated in FIG. 12 is described. Sensors in the control flow illustrated in FIG. 12 are the surface pressure sensor 4*a* and the gyroscope 4*b*. Control performed when a wearer in a state of being seated starts walking is described as an example with reference to the control flow illustrated in FIG. 12.

In Step S101, the controller 28 monitors whether first information has been received from each of the surface pressure sensor 4*a* and the gyroscope 4*b*. When it has been determined that the first information has not been received (Step S101; No), the controller 28 repeats the process of Step S101. When it has been determined that the first information has been received (Step S101; Yes), the controller 28 obtains a detection pressure that is a real-time pressure applied when the headphone unit 3 is pressed against the wearer, on the basis of the first information received from the surface pressure sensor 4*a*. Then, the controller 28 determines the motion state of the wearer on the basis of the first information received from the gyroscope 4*b*. For example, the controller 28 determines that there has been a change in the motion state of the wearer, more specifically, determines that the state of the wearer has been changed from a state of being seated to a state of walking. For example, this determination can be performed by comparing a currently received piece of first information with pieces of information chronologically received in the past (for example, a previously received piece of first information).

Thereafter, the process moves on to Step S102, and the controller 28 determines the number of first wires 24 to be energized. More specifically, the controller 28 increases the number of first wires 24 to be energized, compared to an initial state in which the wearer is seated. For example, the number of first wires 24 to be energized is increased by one, compared to when the wearer is seated. The head of the wearer shakes more greatly upon walking than upon being seated. Thus, the pressure applied when the headphone unit 3 is pressed against the wearer is increased in order not to dislodge the headphone unit 3 from the head. Then, the processes of and after Step S103 are performed. The processes of Steps S103 to S106 are similar to the processes of Steps S3 to S6 illustrated in FIG. 8. Thus, a description thereof is omitted.

Primary Effects Provided by Second Embodiment

The headphone 1 according to the second embodiment provides effects similar to the effects provided by the above-described headphone 1 according to the first embodiment.

Further, in the headphone 1 according to the second embodiment, the controller 28 automatically determines the number of first wires 24 to be energized, on the basis of first information indicating a result of detection performed by the sensor 4. This enables a wearer himself/herself to save the effort to change a pressure.

Furthermore, in the headphone 1 according to the second embodiment, the pressure applied when the headphone unit 3 is pressed against a wearer is automatically adjusted. This enables a wearer to spend his/her time comfortably.

Further, in the second embodiment of the present technology, the plurality of first wires 24 each made of a shape memory alloy of which a length is made smaller when the shape memory alloy reaches the first temperature or above due to being energized, is arranged in an array. This makes it possible to perform adjustment to increase or reduce, in multiple stages, the pressure applied when the headphone unit 3 is pressed against a wearer. Consequently, the level of comfort obtained when a wearer is wearing the headphone

1 can be adjusted in multiple stages, and this results in being able to finely provide a wearing comfort according to a state of the wearer.

Note that, in the flow of control performed by the controller 28, the number of first wires 24 to be energized is increased by one, compared to when the wearer is seated. However, the number of first wires 24 to be increased is not limited to one, and may be two or more. Further, the number of first wires 24 to be energized may be determined in advance according to a motion state of the wearer.

Further, in the flow of control performed by the controller 28, the number of first wires 24 to be energized is changed when there has been a change in a motion state of a wearer, the number of first wires 24 to be energized being changed on the basis of chronologically received current first information and previous first information. However, the present technology is not limited thereto. Only on the basis of current first information, the controller 28 may determine the number suitable for a real-time motion state of a wearer.

Furthermore, in the flow of control performed by the controller 28, the number of first wires 24 to be energized is determined only on the basis of first information received from the gyroscope 4*b* from between the first information received from the gyroscope 4*b* and first information received from the surface pressure sensor 4*a*. However, the present technology is not limited thereto. The controller 28 may change the number of first wires 24 to be energized, on the basis of both the first information received from the gyroscope 4*b* and the first information received from the surface pressure sensor 4*a*. For example, an optimal pressure applied when the headphone unit 3 is pressed against a wearer (an optimal pressure) may be determined in advance for each expected motion state of the wearer to be stored in, for example, the memory M, and, when the controller 28 detects a motion state of the wearer on the basis of first information received from the gyroscope 4*b*, the controller 28 may determine the number of first wires 24 to be energized, such that the optimal pressure for the detected motion state is obtained. In this case, feedback processing may be performed such that a detection pressure gets close to the optimal pressure.

Further, the controller 28 may determine the number of first wires 24 to be energized, only on the basis of first information received from the surface pressure sensor 4*a* from between first information received from the gyroscope 4*b* and the first information received from the surface pressure sensor 4*a*. For example, when the controller 28 determines, on the basis of the first information received from the surface pressure sensor 4*a*, that there has been a decrease in real-time pressure, the controller 28 may determine that the headphone 1 is nearly dislodged from a wearer, and may increase the number of first wires 24 to be energized.

Modifications of Second Embodiment

Modifications of the second embodiment are described.

First Modification

Figure 13:
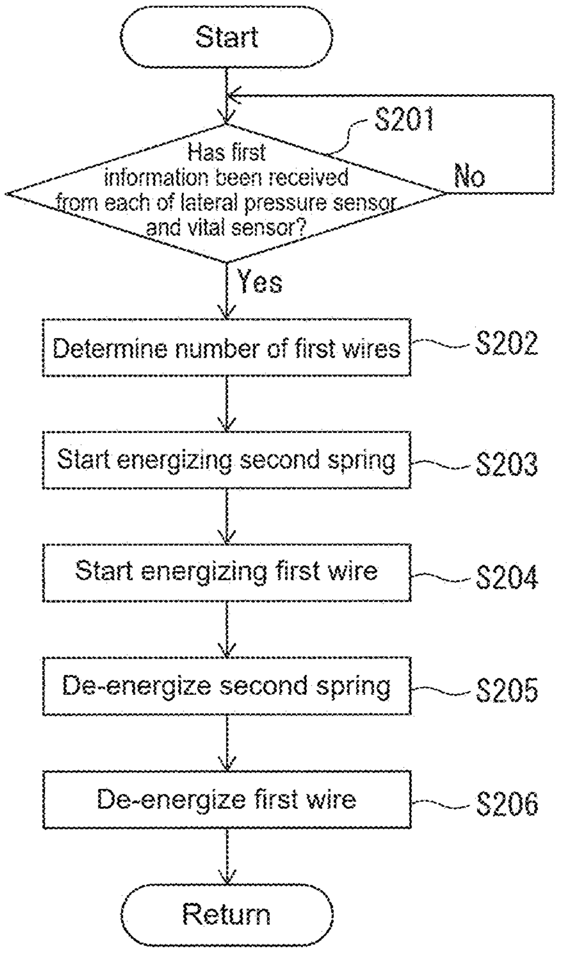
FIG. 13 is a flowchart illustrating a flow of control performed by the controller included in the headphone according to a modification of the second embodiment.

A flow of control according to a first modification of the second embodiment that is performed by the controller 28 and illustrated in FIG. 13, is described. In this modification, processing performed when a wearer gets tired by wearing the headphone 1 for a long time, is described as an example. In the control flow illustrated in FIG. 13, sensors are the surface pressure sensor 4*a* and the vital sensor 4*c*. Further, an example in which a blood flow sensor is used as the vital sensor 4*c*, is described, although the vital sensor 4*c* is not limited thereto.

In Step S201, the controller 28 monitors whether first information has been received from each of the surface pressure sensor 4*a* and the vital sensor 4*c*. When it has been determined that the first information has not been received (Step S201; No), the controller 28 repeats the process of Step S201. When it has been determined that the first information has been received (Step S201; Yes), the controller 28 obtains a detection pressure that is a real-time pressure applied when the headphone unit 3 is pressed against a wearer, on the basis of the first information received from the surface pressure sensor 4*a*. Then, the controller 28 determines the somatopsychic state of the wearer on the basis of the first information received from the vital sensor 4*c*. For example, the controller 28 determines that there has been a change in the somatopsychic state of the wearer, more specifically, determines that the wearer is tired. For example, this determination can be performed by comparing a currently received piece of first information with pieces of information chronologically received in the past (for example, a previously received piece of first information). For example, when there has been a decrease in blood flow of the wearer, it is determined that a wearer is tired.

Thereafter, the process moves on to Step S202, and the controller 28 determines the number of first wires 24 to be energized. More specifically, the controller 28 reduces the number of first wires 24 to be energized, compared to the number of first wires 24 making it possible to generate a current pressure applied when the headphone unit 3 is pressed against the wearer. For example, the number of first wires 24 to be energized is reduced by one, compared to the number of first wires 24 making it possible to generate the current pressure. This makes it possible to reduce the pressure applied when the headphone unit 3 is pressed against the wearer, and thus to reduce burdens imposed on the wearer. Then, the processes of and after Step S203 are performed. The processes of Steps S203 to S206 are similar to the processes of Steps S3 to S6 illustrated in FIG. 8. Thus, a description thereof is omitted.

The headphone 1 according to the first modification of the second embodiment provides effects similar to the effects provided by the above-described headphone 1 according to the second embodiment.

Note that, in the flow of control performed by the controller 28, the number of first wires 24 to be energized is reduced by one, compared to when the wearer is not tired. However, the number of first wires 24 to be reduced is not limited to one, and may be two or more. Further, the number of first wires 24 to be energized may be determined in advance according to a degree of tiredness of the wearer.

Further, in the flow of control performed by the controller 28, the number of first wires 24 to be energized is changed when there has been a change in a degree of tiredness of a wearer, the number of first wires 24 to be energized being changed on the basis of chronologically received current first information and previous first information. However, the present technology is not limited thereto. Only on the basis of current first information, the controller 28 may determine the number suitable for a real-time degree of tiredness of a wearer.

Furthermore, in the flow of control performed by the controller 28, the number of first wires 24 to be energized is determined only on the basis of first information received from the vital sensor 4*c* from between the first information received from the vital sensor 4*c* and first information received from the surface pressure sensor 4*a*. However, the present technology is not limited thereto. The controller 28 may change the number of first wires 24 to be energized, on the basis of both the first information received from the vital sensor 4*c* and the first information received from the surface pressure sensor 4*a*. For example, an optimal pressure applied when the headphone unit 3 is pressed against a wearer (an optimal pressure) may be determined in advance according to a degree of tiredness of the wearer to be stored in, for example, the memory M, and, when the controller 28 detects a degree of tiredness of the wearer on the basis of first information received from the vital sensor 4*c*, the controller 28 may determine the number of first wires 24 to be energized, such that the optimal pressure for the detected degree of tiredness is obtained. In this case, feedback processing may be performed such that a detection pressure gets close to the optimal pressure.

Further, in the flow of control performed by the controller 28, the degree of tiredness of the wearer is determined on the basis of the first information received from the vital sensor 4*c*. However, the degree of tiredness of the wearer may be determined on the basis of a wearing period of time for which the wearer wears the headphone 1. For example, the determination may be performed on the basis of a period of time for which the first information is received from the sensor 4, although the wearing period of time is not limited thereto. For example, the determination may be performed, with the wearing period of time being a period of time for which the first information received from the surface pressure sensor 4*a* does not indicate "zero pressure".

Furthermore, the vital sensor 4*c* may be any sensors other than a blood flow sensor, and the somatopsychic state may be any sensors other than the degree of tiredness.

Further, for example, the controller 28 may determine a degree of comfort of a wearer using a brain wave sensor as the vital sensor 4*c* on the basis of first information received from the brain wave sensor, and may determine the number of first wires 24 to be energized, on the basis of a result of the determination. More specifically, feedback processing may be performed at this point, and the number of first wires 24 may be adjusted until the wearer feels comfortable.

Furthermore, the controller 28 may determine a magnitude of noise for a result of detection performed by the sensor 4, on the basis of first information, and may determine the number of first wires 24 to be energized, on the basis of the magnitude of the noise. For example, using, as the sensor 4, the vital sensor 4*c* such as a pulse sensor, the controller 28 may determine a magnitude of noise for a result of detection performed by the pulse sensor on the basis of first information received from the pulse sensor. A magnitude of noise for a result of detection performed by the pulse sensor tends to be decreased as the pulse sensor becomes tighter on the head of a wearer. In other words, the magnitude of noise is smaller if the degree of tightening of the head with the headphone 1 is higher. Then, when the magnitude of noise is less than a specified value, the controller 28 may determine the degree of tightening of the head with the headphone 1 is too high, and may reduce the number of first wires 24 to be energized, in order to make the degree of tightening lower.

Further, for example, a brain wave sensor may be used as the vital sensor 4*c*, a wearer may wish that the degree of tightening would be "higher" or "lower", and what the wearer wishes may be reported to the controller 28 as first information. Then, the controller 28 may determine the number of first wires 24 to be energized, according to the received first information.

Third Embodiment

Figure 14:
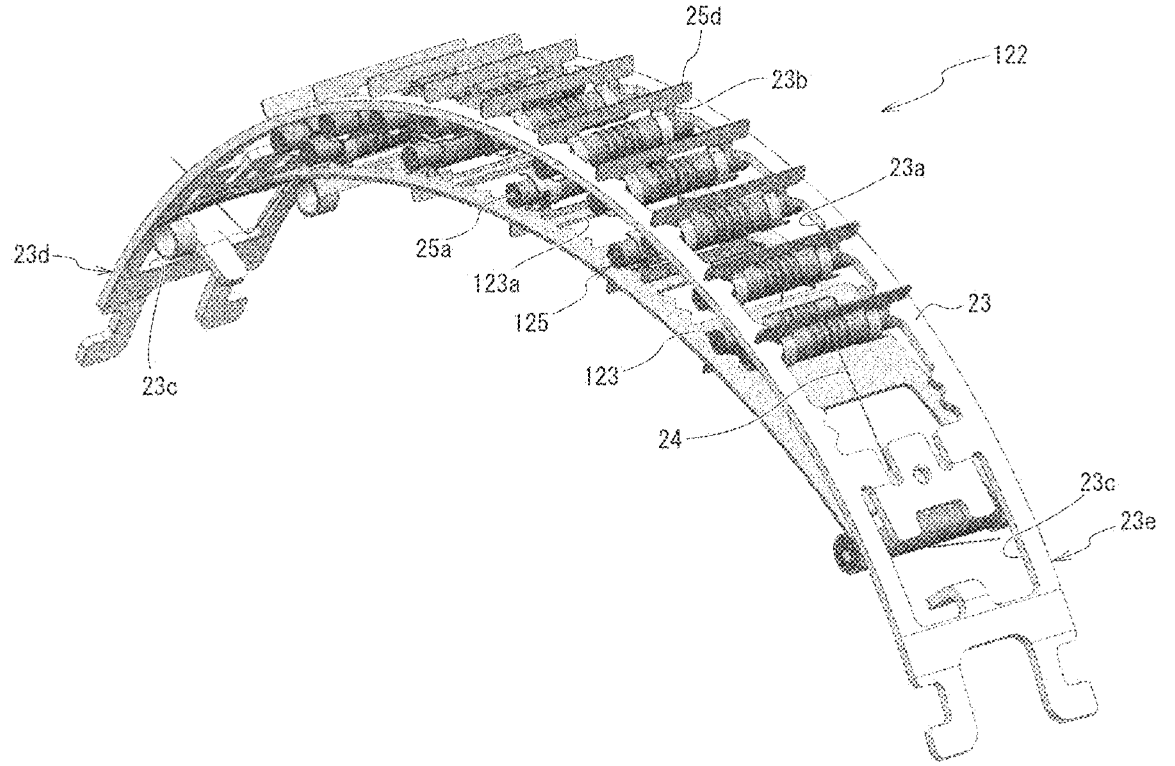
FIG. 14 is a perspective view illustrating a configuration of an actuator included in the headphone according to a third embodiment.
Figure 15:
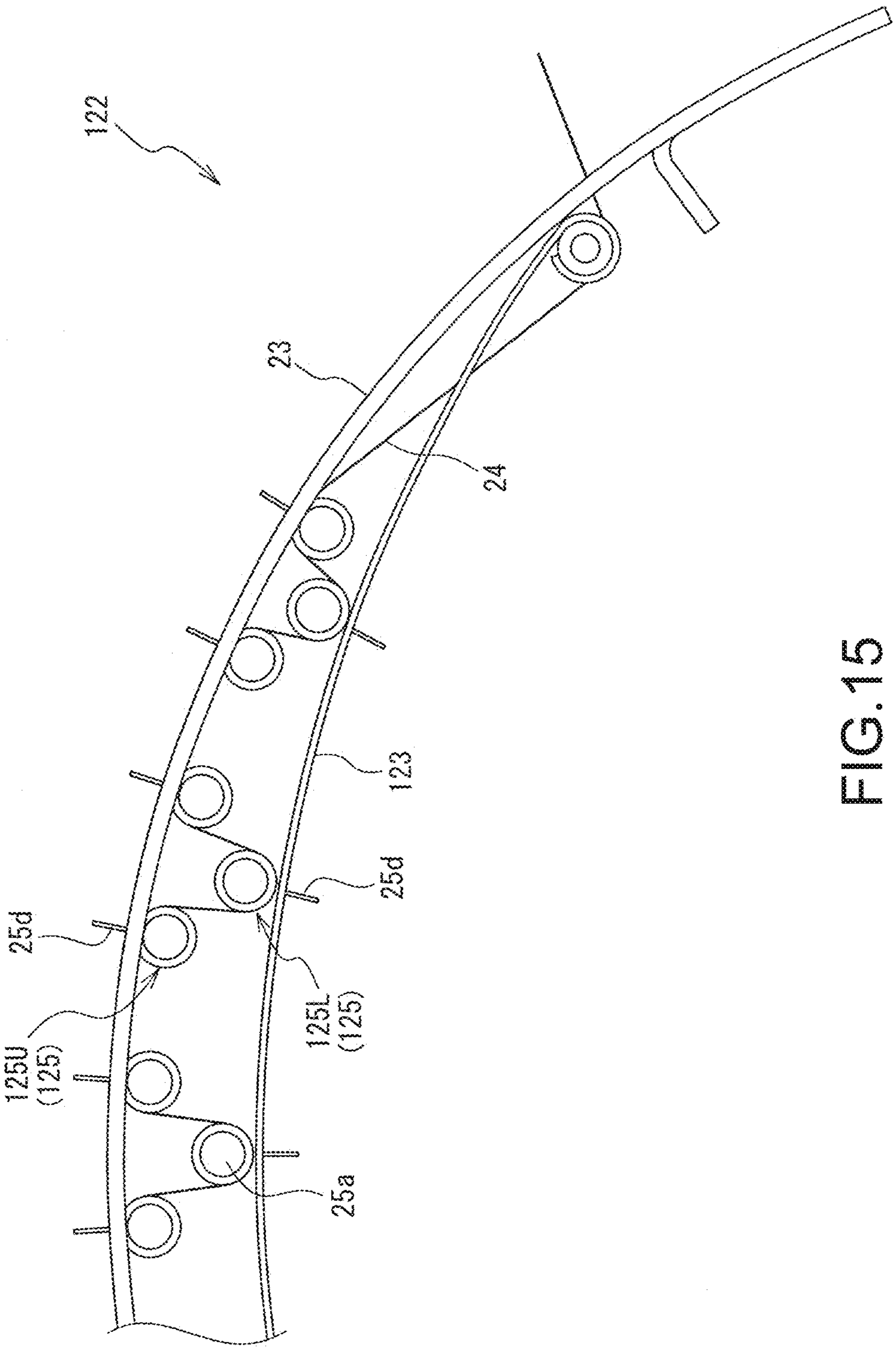
FIG. 15 is a side view illustrating a configuration of a portion of the actuator included in the headphone according to the third embodiment.

A third embodiment of the present technology that is illustrated in FIGS. 14 and 15 is described below. The headphone 1 according to the third embodiment is different from the above-described headphone 1 according to the first embodiment in including an actuator 122 instead of the actuator 22. Regarding the other points, the headphone 1 has a configuration essentially similar to the configuration of the above-described headphone 1 according to the first embodiment. Note that the already described structural element is denoted by the same reference numeral, and a description thereof is omitted. Further, an illustration of the second wire 27 is omitted in FIGS. 14 and 15. FIGS. 14 and 15 only illustrate one of a plurality of first wires 24.

<Actuator>

The actuator 122 includes the frame 23 (a first frame), a frame 123 (a second frame), the first wires 24, supports 125, the locking mechanism 26, and the second wire 27, where illustrations of the locking mechanism 26 and the second wire 27 are omitted.

<Frame>

As illustrated in FIG. 14, the actuator 122 includes the frame 123 in addition to the frame 23. The frame 123 is formed by punching being performed on a metallic flat plate. A plurality of openings 123*a* is longitudinally punched in the frame 123. Further, as in the case of the frame 23, pluralities of pairs of notches are equally spaced longitudinally on respective inner surfaces of the plurality of openings 123*a*, where each pair of notches is used to fix the support 125. A pair of notches is provided to the opening 123*a*, where the support 125 is fixed to the pair of notches. Examples of metal of which the frame 123 is made include stainless and iron. The present embodiment is described on the assumption that the frame 123 is made of stainless.

The actuator 122 has a double structure that includes the frame 23 and the frame 123. The frame 123 is provided more closely to the head when the headphone 1 is worn than the frame 23. The frame 23 and the frame 123 are curved along a longitudinal direction of the frame 23 and the frame 123 in the same orientation, and degrees of curvatures of the frame 23 and the frame 123 are changeable. Two ends of the frame 123 in the orientation of the curve are slidably in contact with the frame 23, and a portion other than the two ends is spaced from the frame 23. The frame 23 and the frame 123 are elastic in the direction of the curve, and the degrees of curvatures of the frame 23 and the frame 123 can be adjusted using the first wire 24.

<Support>

The support 125 includes the cylindrical member 25*a* and the support plate 25*d*, and does not the spacer 25*b*. The respective supports 125 are attached to the frame 23 and the frame 123. More specifically, the support 125 is attached to each of the frame 23 and the frame 123 such that the cylindrical member 25*a* is in a space situated between the frame 23 and the frame 123. Further, as illustrated in FIG. 15, the support plate 25*d* of the support 125 holds the cylindrical member 25*a* closer to each of the frame 23 and the frame 123, compared to the case of the first embodiment in FIG. 4.

As illustrated in FIG. 15, a support that is from among the supports 125 and is attached to the frame 23 is referred to as a support 125U (a first support), and a support that is from among the supports 125 and is attached to the frame 123 is referred to as a support 125L (a second support). The support 125U and the support 125L may each be simply referred to as the support 125 when they are not particularly to be distinguished. A set of supports 125 includes two supports 125U and a support 125L, and the actuator 122 includes a plurality of the sets. In the set, the support 125L is provided not to overlap the support 125U in a direction in which the frame 23 and the frame 123 overlap (the thickness direction). More specifically, the support 125L is situated between the two supports 125U in the set.

Further, the first wire 24 is supported by being put along the support 1250, the support 125L, and support 125U in this order in each set. In other words, the first wire 24 is supported alternately by the frame 23 (the support 1250) and the frame 123 (the support 125L). Note that the first wire 24 is put along the supports 125U consecutively in adjacent sets, and the being supported alternately may include such a case. When the first wire 24 in such a state reaches the first temperature or above and has the second length smaller than the first length, the first wire 24 serves to cause the frame 23 and the frame 123 to pull toward each other. Further, this makes it possible to increase the degrees of curvatures of the frame 23 and the frame 123. Furthermore, as in the case of the first wire 24, the second wire 27 is supported by the support 1250 and the support 125L, although the illustration of the second wire 27 is omitted.

Primary Effects Provided by Third Embodiment

The headphone 1 according to the third embodiment provides effects similar to the effects provided by the above-described headphone 1 according to the first embodiment.

Further, the headphone 1 according to the third embodiment makes it possible to decrease force necessary to increase the degree of curvature of the headband 2, compared to the case of the headphone 1 according to the first embodiment. More specifically, the headphone 1 according to the third embodiment makes it possible to decrease, to about one-fifth, force (first force) necessary for the headphone unit 3 to be pressed against a wearer with a constant pressure, compared to the case of the headphone 1 according the first embodiment. Further, even when the headphone 1 according to the third embodiment uses the first wire 24 having the same rate of expansion and contraction as the headphone 1 according to the first embodiment, the first force can be decreased, compared to the case of the headphone 1 according to the first embodiment. As described above, the first wire 24 has the first length when the temperature of the first wire 24 is lower than the first temperature, and the first wire 24 has the second length when the temperature of the first wire 24 is higher than or equal to the first temperature, the second length being smaller than the first length. The rate of expansion and contraction refers to a rate that represents, in the form of %, an amount of contraction of the first wire 24 having a certain length when the certain length is changed from the first length to the second length.

Fourth Embodiment

Figure 16:
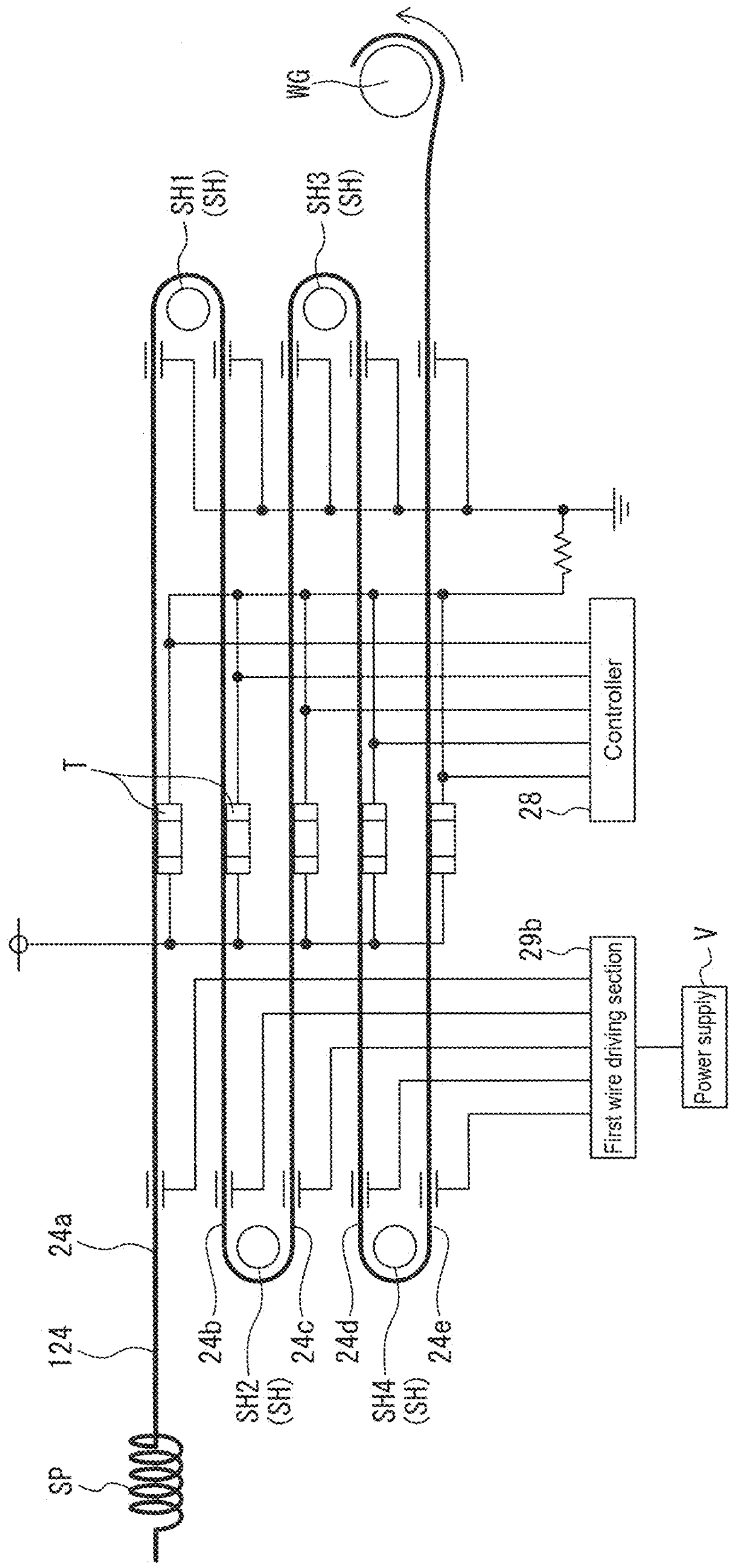
FIG. 16 is a diagram used to describe a configuration of the first wires of the actuator included in the headphone according to a fourth embodiment.

A fourth embodiment of the present technology that is illustrated in FIG. 16 is described below. The headphone 1 according to the fourth embodiment is different from the above-described headphone 1 according to the first embodiment in including a different first wire. Regarding the other points, the headphone 1 has a configuration essentially similar to the configuration of the above-described headphone 1 according to the first embodiment. Note that the already described structural element is denoted by the same reference numeral, and a description thereof is omitted.

<First Wire>

In the present embodiment, a single first wire 124 is folded back along folding-back axes SH to serve as a plurality of first wires 24, as illustrated in FIG. 16. Folding-back axes SH2 and SH4 are provided at the end 23*d* (refer to FIG. 1) of the frame 23, and folding-back axes SH1 and SH3 are provided at the end 23*e* (refer to FIG. 1) of the frame 23. Accordingly, the single first wire 124 is folded back along the folding-back axes SH1 to SH4. Further, one of ends of the single first wire 124 is fixed to the end 23*d* of the frame 23 through a member SP such as a coil spring, and another of the ends of the single first wire 124 is fixed to the end 23*e* of the frame 23 through a member WG such as a worm gear.

Further, wiring that extends from the first wire driving section 29*b* to each first wire 24 is connected via swaging to a portion of the first wire 24 that is situated closer to the folding-back axis SH2 or SH4, and wiring that extends from a ground (a reference potential) to the respective first wires 24 is connected via swaging to a portion of the first wire 24 that is situated closer to the folding-back axis SH1 or SH3. Note that, due to a difference in electric resistance, current that is supplied to the first wire 24 easily flows in a direction of the most closely situated ground (the reference potential). Thus, if current flows through another first wire 24, an amount of the flowing current will be very small. Such a configuration makes it possible to selectively supply power to the respective first wires 24.

Further, a thermometer T is provided to each first wire 24, and this makes it possible to measure a temperature of the first wire 24. The thermometer T is, for example, a thermistor, although the thermometer T is not limited thereto. The thermometer T is connected to the controller 28 through wiring, and the controller 28 receives a temperature detected by each thermometer T, and monitors the received temperature. The controller 28 maintains the first wire 24 at a temperature close to the first temperature, on the basis of the temperature detected by the thermometer T. More specifically, the controller 28 maintains the first wire 24 at a temperature slightly lower than the first temperature. When the first wire 24 is maintained at such a temperature, this makes it possible to shorten the time necessary for the temperature of the first wire 24 to exceed after the first wire 24 starts to be energized in order to make the degree of curvature of the frame 23 higher. This prevents a reaction speed of the actuator 22 from being made slower.

Primary Effects of Fourth Embodiment

The headphone 1 according to the fourth embodiment provides effects similar to the effects provided by the headphone 1 according to the first embodiment.

Further, in the headphone 1 according to the fourth embodiment, the controller 28 maintains the first wire 24 at a temperature close to the first temperature, more specifically, at a temperature slightly lower than the first temperature. This prevents a reaction speed of the actuator 22 from being made slower.

Other Embodiments

The present technology has been described using the first to fourth embodiments, as described above. The description and drawings being part of the present disclosure should not be considered to limit the present technology. Various alternative embodiments, examples, and operational techniques will be apparent to those skilled in the art from the present disclosure.

Figure 17:
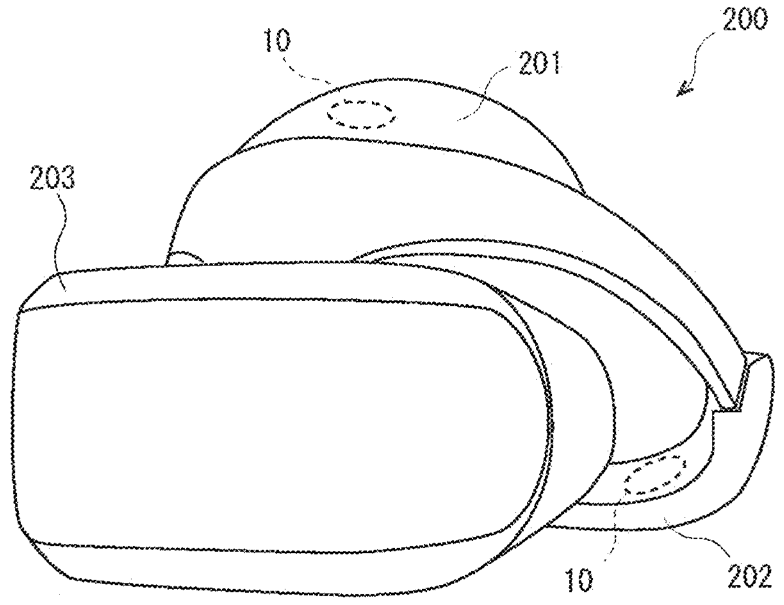
FIG. 17 schematically illustrates an example in which the actuator of the present technology is used in a head-mounted display.
Figure 18:
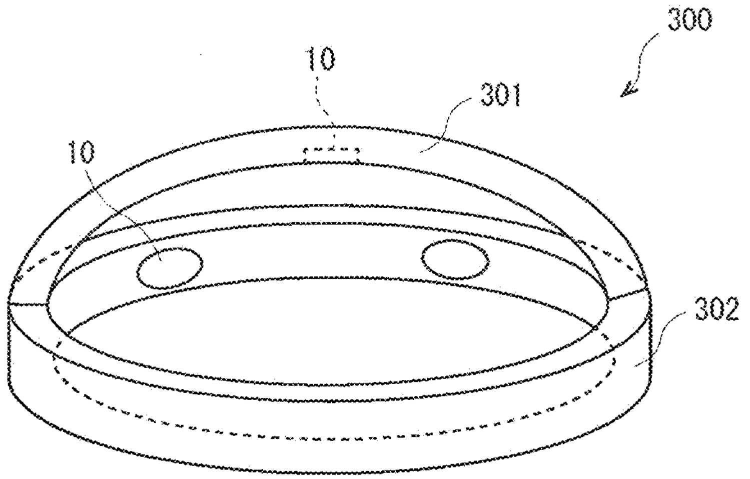
FIG. 18 schematically illustrates an example in which the actuator of the present technology is used in a headband.

For example, the technical ideas respectively described in the first to fourth embodiments may be used in combination. Further, the example in which the present technology is applied to the headphone 1 has been described in the embodiments above. However, the present disclosure is not limited thereto. For example, the present technology can be applied to a head-mounted display 200 illustrated in FIG. 17. In the head-mounted display 200, sensor electrodes 10 are provided, for example, on inner surfaces of a pad 201 and a band 202. Further, the present technology is applied to the band 202. More specifically, for example, the actuator and locking mechanism according to the present technology are applied to the band 202. Alternatively, for example, the present technology can be applied to a headband 300 illustrated in FIG. 18. In the headband 300, the sensor electrodes 10 are provided, for example, on inner surfaces of bands 301 and 302 that are brought into contact with the head. Further, the present technology is applied to the bands 301 and 302. More specifically, for example, the actuator and locking mechanism according to the present technology are applied to the bands 301 and 302. Note that the sensors provided to the head-mounted display 200 and the headband 300 are biopotential sensors that detect biological signals generated due to brain waves, heartbeat, or pulse. Such biopotential sensors each include at least one of a function included in the sensor 4 described in the embodiments above, or a function of simply detecting biological signals.

Further, those skilled in the art will appreciate, in consideration of the technologies described above, that the controller 28 described in the example embodiments is based on the use of at least one programed microcomputer or processor programed using a favorable computer program. However, the present technology is not limited to such example embodiments since another embodiment can be implemented using an equivalent of a hardware configuration including dedicated hardware and/or a dedicated processor. Likewise, another equivalent embodiment can be provided using a general-purpose computer, a microprocessor-based computer, a microcontroller, an optical computer, an analog computer, a dedicated computer, an application-specific integrated circuit, and/or a dedicated hard-wired logic.

Further, the head-mounted display 200 includes the pad, the band 202 connected to the pad 201, and a display 203 connected to the band 202.

Of course, the present technology includes, for example, various embodiments that are not described herein, as described above. Therefore, the technical scope of the present technology is only defined by the subject matter appropriately claimed in consideration of the description above.

Further, the effects described herein are not limitative but are merely illustrative, and other effects may be provided.

Note that the present technology may also take the following configurations.

(1) A wearable device, including:
- a frame that is curved along a longitudinal direction of the frame and of which a degree of curvature is changeable;
- a plurality of first wires arranged in a widthwise direction of the frame, each of the plurality of first wires being supported to be provided to the frame along the longitudinal direction, each of the plurality of first wires being made of a shape memory alloy of which a length is made smaller when the shape memory alloy reaches a first temperature or above due to being energized; and
- a controller that receives first information and is capable of controlling energization of a first wire of the plurality of first wires on the basis of the first information, the control of the energization enabling the degree of curvature of the frame to be adjusted.

(2) The wearable device according to (1), further including:
- a locking mechanism that is fixed to a portion of the frame that is close to one of longitudinally situated ends of the frame; and
- a second wire that is supported to be provided to the frame along the longitudinal direction, in which
- a state of the second wire is switchable between a fixed state and a non-fixed state, the fixed state being a state in which one of ends of the second wire is fixed to the locking mechanism, the non-fixed state being a state in which the one of the ends of the second wire is not fixed to the locking mechanism,
- another of the ends of the second wire is fixed to a portion of the frame that is close to another of the longitudinally situated ends of the frame,
- the controller controls the fixed state and the non-fixed state of the second wire using the locking mechanism,
- the controller energizes the first wire while the second wire is in the non-fixed state, and
- when adjustment of the degree of curvature of the frame is completed, the state of the second wire is changed to the non-fixed state using the locking mechanism to de-energize the first wire.

(3) The wearable device according to (1) or (2), in which
- a plurality of supports equally spaced from each other is provided to the frame in the longitudinal direction, and
- the first wire passes between the frame and a cylindrical member that is included in each of the plurality of supports.

(4) The wearable device according to (1) or (2), in which
- the frame includes a first frame and a second frame that are curved along the longitudinal direction in the same orientation,
- a plurality of first supports equally spaced from each other is provided to the first frame,
- a plurality of second supports equally spaced from each other is provided to the second frame, and
- the first wire is supported alternately by a first support of the plurality of first supports and a second support of the plurality of second supports.

(5) The wearable device according to any one of (1) to (4), in which
- the controller determines the number of the first wires to be energized from among the plurality of first wires, on the basis of the first information.

(6) The wearable device according to any one of (1) to (5), further including a sensor, in which
- the first information indicates a result of detection performed by the sensor.

(7) The wearable device according to (6), in which
- the sensor is a vital sensor that is capable of detecting vital information regarding a wearer of the wearable device.

(8) The wearable device according to (7), in which
the controller determines a degree of comfort of the wearer on the basis of the first information, and
on the basis of a result of the determination, the controller determines the number of the first wires to be energized.

(9) The wearable device according to (7), in which
the controller determines a degree of tiredness of the wearer on the basis of the first information, and
on the basis of a result of the determination, the controller determines the number of the first wires to be energized.

(10) The wearable device according to (7), in which
the controller determines a magnitude of noise for the result of the detection performed by the sensor, on the basis of the first information, and
the controller determines the number of the first wires to be energized, on the basis of the magnitude of the noise.

(11) The wearable device according to (6), in which
the sensor is a gyroscope.

(12) The wearable device according to (6), in which
the sensor is a surface pressure sensor.

(13) The wearable device according to any one of (1) to (12), in which
the wearable device is a head-mounted wearable device.

The scope of the present technology is not limited to the illustrated and described example embodiments, but includes all of the embodiments providing effects equivalent to effects that are intended to be provided by the present technology. Further, the scope of the present technology is not limited to combinations of claimed features of the present technology, but may be provided by any desired combinations of specific features from among all of the disclosed features.

REFERENCE SIGNS LIST

1 headphone
2 headband
3 headphone unit
3*a*, 3*b* headphone unit
4 sensor
4*a* surface pressure sensor
4*b* gyroscope
4*c* vital sensor
21 casing
22, 122 actuator
23, 123 frame
23*a* opening
23*b* notch
23*c* opening
23*d*, 23*e* end
24, 24*a*, 24*b*, 24*c*, 24*d*, 24*e*, 124 first wire
25, 125, 125L, 125U support
25*a* cylindrical member
25*b* spacer
25*c* screw
25*d* support plate
26 locking mechanism
26*e* first spring
26*f* second spring
27 second wire
28 controller
28*a* wireless communication section
29 drive section
29*a* locking mechanism driving section
29*b* first wire driving section
31 housing
32 ear pad frame
P terminal

The invention claimed is:

1. A wearable device, comprising:
a frame that is curved along a longitudinal direction of the frame and of which a degree of curvature is changeable;
a plurality of first wires arranged in a widthwise direction of the frame, each of the plurality of first wires being supported to be provided to the frame along the longitudinal direction, each of the plurality of first wires being made of a shape memory alloy of which a length is made smaller when the shape memory alloy reaches a first temperature or above due to being energized; and
a controller that receives first information and is capable of controlling energization of a first wire of the plurality of first wires on a basis of the first information, the control of the energization enabling the degree of curvature of the frame to be adjusted.

2. The wearable device according to claim 1, further comprising:
a locking mechanism that is fixed to a portion of the frame that is close to one of longitudinally situated ends of the frame; and
a second wire that is supported to be provided to the frame along the longitudinal direction, wherein
a state of the second wire is switchable between a fixed state and a non-fixed state, the fixed state being a state in which one of ends of the second wire is fixed to the locking mechanism, the non-fixed state being a state in which the one of the ends of the second wire is not fixed to the locking mechanism,
another of the ends of the second wire is fixed to a portion of the frame that is close to another of the longitudinally situated ends of the frame,
the controller controls the fixed state and the non-fixed state of the second wire using the locking mechanism,
the controller energizes the first wire while the second wire is in the non-fixed state, and
when adjustment of the degree of curvature of the frame is completed, the state of the second wire is changed to the non-fixed state using the locking mechanism to de-energize the first wire.

3. The wearable device according to claim 1, wherein
a plurality of supports equally spaced from each other is provided to the frame in the longitudinal direction, and
the first wire passes between the frame and a cylindrical member that is included in each of the plurality of supports.

4. The wearable device according to claim 1, wherein
the frame includes a first frame and a second frame that are curved along the longitudinal direction in the same orientation,
a plurality of first supports equally spaced from each other is provided to the first frame,
a plurality of second supports equally spaced from each other is provided to the second frame, and
the first wire is supported alternately by a first support of the plurality of first supports and a second support of the plurality of second supports.

5. The wearable device according to claim 1, wherein
the controller determines a number of first wires to be energized from among the plurality of first wires, on the basis of the first information.

6. The wearable device according to claim 1, further comprising a sensor, wherein the first information indicates a result of detection performed by the sensor.

7. The wearable device according to claim 6, wherein the sensor is a vital sensor that is capable of detecting vital information regarding a wearer of the wearable device.

8. The wearable device according to claim 7, wherein the controller determines a degree of comfort of the wearer on the basis of the first information, and on a basis of a result of the determination, the controller determines a number of first wires from the plurality of first wires to be energized.

9. The wearable device according to claim 7, wherein the controller determines a degree of tiredness of the wearer on the basis of the first information, and on a basis of a result of the determination, the controller determines a number of first wires from the plurality of first wires to be energized.

10. The wearable device according to claim 7, wherein the controller determines a magnitude of noise for the result of the detection performed by the sensor, on the basis of the first information, and the controller determines a number of first wires from the plurality of first wires to be energized, on a basis of the magnitude of the noise.

11. The wearable device according to claim 6, wherein the sensor is a gyroscope.

12. The wearable device according to claim 6, wherein the sensor is a surface pressure sensor.

13. The wearable device according to claim 1, wherein the wearable device is a head-mounted wearable device.

* * * * *